(12) United States Patent
Kim

(10) Patent No.: US 10,284,763 B2
(45) Date of Patent: May 7, 2019

(54) ELECTRONIC DEVICE HAVING A BAND AND CONTROL METHOD THEREFOR

(71) Applicant: LG ELECTRONICS INC., Seoul (KR)

(72) Inventor: Sungmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/545,230

(22) PCT Filed: Jan. 30, 2015

(86) PCT No.: PCT/KR2015/001039
§ 371 (c)(1),
(2) Date: Jul. 20, 2017

(87) PCT Pub. No.: WO2016/117745
PCT Pub. Date: Jul. 28, 2016

(65) Prior Publication Data
US 2018/0013947 A1 Jan. 11, 2018

(30) Foreign Application Priority Data

Jan. 20, 2015 (KR) .......................... 10-2015-0009435
Jan. 29, 2015 (KR) .......................... 10-2015-0014606

(51) Int. Cl.
*H04N 5/225* (2006.01)
*H04N 5/232* (2006.01)
(Continued)

(52) U.S. Cl.
CPC ....... *H04N 5/23203* (2013.01); *G04B 19/286* (2013.01); *G04B 47/06* (2013.01);
(Continued)

(58) Field of Classification Search
CPC ........... H04N 5/23203; H04N 5/23245; H04N 5/2253; H04N 5/23293; H04N 5/23216; G06F 1/163; G06F 1/1681; G06F 1/1679
See application file for complete search history.

(56) References Cited

U.S. PATENT DOCUMENTS 6,158,884 A * 12/2000 Lebby .................... G04B 47/00
224/165
6,788,621 B2 * 9/2004 Meylan ................ A44C 5/0007
368/10
(Continued)

FOREIGN PATENT DOCUMENTS

KR    10-2014-0064687    5/2014
KR    10-2015-0000206    1/2015

OTHER PUBLICATIONS

International Search Report (with English Translation) and Written Opinion dated Jul. 22, 2015 issued in Application No. PCT/KR2015/001039.

*Primary Examiner* — Ngoc Yen T Vu
(74) *Attorney, Agent, or Firm* — Ked & Associates, LLP

(57) ABSTRACT

Provided is an electronic device. The electronic device includes: a main body mounted with an electronic unit including a controller, including a bezel disposed at the outer side thereof, and having a locking groove formed in the bezel; and a band part mounted with an additional device for exchanging an electric signal with the electronic unit and an electronic part providing information related to the additional device for the electronic unit, and including a coupling part detachably coupled to the locking groove. Here, the controller switches an operation mode of the main body according to the information related to the additional device provided by the electronic part when the main body and the band part are coupled to each other. Thus, when the band part mounted with the additional device is connected to the
(Continued)

main body, the operation mode of the main body is automatically switched to a mode corresponding to the additional device, thereby providing convenience of use.

18 Claims, 41 Drawing Sheets

(51) Int. Cl.
    *G06F 13/14* (2006.01)
    *G04B 19/28* (2006.01)
    *G04B 47/06* (2006.01)
    *G06F 1/16* (2006.01)
    *H02J 7/02* (2016.01)
    *G06F 3/0488* (2013.01)
    *H02J 50/12* (2016.01)

(52) U.S. Cl.
    CPC ............ *G06F 1/163* (2013.01); *G06F 1/1656* (2013.01); *G06F 1/1679* (2013.01); *G06F 1/1681* (2013.01); *G06F 13/14* (2013.01); *H02J 7/025* (2013.01); *H04N 5/2253* (2013.01); *H04N 5/23216* (2013.01); *H04N 5/23245* (2013.01); *H04N 5/23293* (2013.01); *G06F 3/0488* (2013.01); *H02J 50/12* (2016.02)

(56) References Cited

U.S. PATENT DOCUMENTS

| | | | | |
|---|---|---|---|---|
| 9,519,142 | B2* | 12/2016 | He | .......... G02B 27/01 |
| 9,729,697 | B2* | 8/2017 | Song | .......... G06F 3/014 |
| 2012/0194976 | A1* | 8/2012 | Golko | .......... G06F 1/163 |
| | | | | 361/679.01 |
| 2014/0177399 | A1 | 6/2014 | Teng et al. | |
| 2018/0307333 | A1* | 10/2018 | Lim | .......... G06F 3/041 |

* cited by examiner

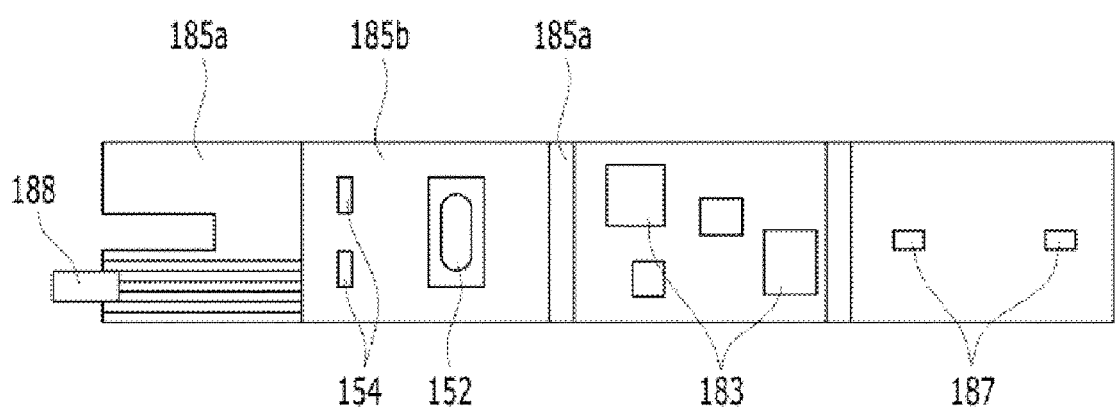

ELECTRONIC DEVICE HAVING A BAND AND CONTROL METHOD THEREFOR

CROSS-REFERENCE TO RELATED PATENT APPLICATIONS

This application is a U.S. National Stage Application under 35 U.S.C. § 371 of PCT Application No. PCT/KR2015/001039, filed Jan. 30, 2015, which claims priority to Korean Patent Application Nos. 10-2015-0009435, filed Jan. 20, 2015, and 10-2015-0014606, filed Jan. 29, 2015, whose entire disclosures are hereby incorporated by reference.

TECHNICAL FIELD

The present invention relates to a watch-type electronic device and a control method thereof, a band part of which is equipped with an additional device such that various additional devices can be easily connected and used.

BACKGROUND ART

A terminal can be divided into a mobile/portable terminal and a stationary terminal according to whether the terminal can be moved. The mobile terminal can be divided into a handheld terminal and a vehicle mounted terminal according to whether a user can directly carry the mobile terminal.

The functions of mobile terminals are being diversified. For example, there are functions of data and voice communication, photographing and video shooting through a camera, voice recording, music file playback through a speaker system, and outputting an image or video to a display unit. Some terminals perform an electronic game play function or a multimedia player function. In particular, recent mobile terminals can receive multicast signals that provide visual contents such as broadcast, video or television programs.

As the functions of terminals are diversified, terminals are implemented into the form of a multimedia device having complex functions such as photographing or video shooting, playing of music or video files, and reception of a game or a broadcast.

In order to support and enhance the function of such a terminal, it may be considered to improve the structural and/or software parts of the terminal.

In recent years, wearable electronic devices worn on a user's body are being studied. For example, attempts are being made for electronic devices of glass type and watch type.

In the case of a wearable type electronic device, since required electronic elements need to be arranged in a limited space while satisfying design requirements, the need for optimized design is increasing.

DISCLOSURE

Technical Problem

Accordingly, the present disclosure provides a watch-type electronic device and a control method thereof, a band part of which is equipped with an additional device such that various additional devices can be easily connected and used.

Technical Solution

In one general aspect, an electronic device includes a main body mounted with an electronic unit including a controller, including a bezel disposed at the outer side thereof, and having a locking groove formed in the bezel; and a band part mounted with an additional device for exchanging an electric signal with the electronic unit and an electronic part providing information related to the additional device for the electronic unit, and including a coupling part detachably coupled to the locking groove, wherein the controller switches an operation mode of the main body according to the information related to the additional device provided by the electronic part when the main body and the band part are coupled to each other.

The electronic device may further include display provided in the main body, wherein the controller further changes information provided on the display in accordance with the switched operation mode.

The additional device includes at least one of a camera, an sound output speaker, a microphone, an light output source, an antenna, an near-field communication (NFC) device, a battery, or a biosensor.

The information related to the additional device includes at least one of identification information related to the additional device, control information, or an application using the additional device.

The controller may switch the operation mode of the device to a camera photographing mode according to camera-related information provided by the electronic circuitry to the controller when the additional device in the band includes a camera.

The controller may switch the operation mode of the device to a sports mode according to biosensor-related information provided by the electronic circuitry to the controller when the additional device in the band includes a biosensor.

The coupling extension may include a pair of coupling extensions that are outwardly moved by an external force and engage the locking groove when the external force is removed, the pair of coupling extensions include ends that are inwardly bent to engage the locking groove.

The coupling extension may be formed to cover at least a portion of side surface regions of the bezel.

The coupling extension may include a locking protrusion protruding from at least one of an upper side surface or a lower side surface in contact with the bezel, the locking protrusion being moved toward an inside region of the coupling extension by an external force and then protruding at the locking groove to fix the band to the bezel.

The electronic device may further comprising: a main body magnet provided in a side surface region of the bezel; and a band magnet provided on the coupling extension and magnetically coupled to the main body magnet.

The coupling extension may include a button that transfers the external force to the locking extension to move the locking extension to an inside surface of the coupling extension.

The bezel may have a circular shape, and the main body further includes: lugs extending from sides of the circular bezel in opposite directions, and an insertion groove formed along a side surface of the lug to receive the coupling extension, the locking groove being formed in at least one of an upper side or a lower side of the insertion groove.

The bezel may have a rectangular shape and includes an insertion groove formed along a side surface of the bezel to receive the coupling extension, and the locking groove is formed in at least one of an upper side or a lower side of the insertion groove.

The electronic device may further comprising a port formed in a coupling region of the bezel and the band and exchanging the electric signal between the device and the additional device.

The port may include a Universal Serial Bus (USB) port.

The band may include a first band section equipped with the first additional device and a second band section equipped with the second additional device.

In another general aspect, a method of controlling an electronic device comprising a main body having a device with a controller mounted therein, and a band having an additional device exchanging an electric signal with the device mounted in the main body and an electronic circuitry providing information related to the additional device to the controller, the method comprising: receiving the information related to the additional device mounted on the band from the electronic circuitry when the main body and the band are coupled to each other; and switching an operation mode of device mounted in the main body to a predetermined operation mode based on the information related to the additional device mounted on the band.

The method may further comprising displaying information related to the switched operation mode on the main body.

The switching of the operation mode of the device mounted on the main body to the predetermined operation mode may include switching the operation mode of the device mounted on the main body to a camera photographing mode according to camera-related information provided by the electronic circuitry to the controller when the additional device includes a camera; and switching the operation mode of the device mounted on the main body to a sports mode according to biosensor-related information provided by the electronic circuitry to the controller when the additional device includes a biosensor.

The electric signal may be exchanged between the device and the additional device via a path that includes the coupling extension.

The coupling extension may include an elastic member that delivers an elastic force such that the locking protrusion outwardly moved by an external force moves to an original position.

Other features and aspects will be apparent from the following detailed description, the drawings, and the claims.

Advantageous Effects

Effects of an electronic device and a control method thereof according to an embodiment of the present invention will be described as follows.

According to at least one of the embodiments of the present invention, when the band part mounted with the additional device is connected to the main body, the operation mode of the main body is automatically switched to a mode corresponding to the additional device, thereby providing convenience of use.

Also, according to at least one of the embodiments of the present invention, since the band part mounted with the additional device can be easily attached and detached, various additional devices can be easily connected and replaced.

In addition, according to at least one of the embodiments of the present invention, it is possible to easily attach and detach band parts of various designs, thereby providing an aesthetic satisfaction.

The additional scope of applicability of the present invention will become apparent from the following detailed description. However, since various changes and modifications within the spirit and scope of the invention will be apparent to those skilled in the art, it should be understood that the detailed description and specific embodiments like preferred embodiments of the present invention are given as only illustration.

DESCRIPTION OF DRAWINGS

FIGS. 4A and 4B are plan views illustrating a band board of an electronic device according to an embodiment of the present invention.

FIG. 17 is a block view illustrating an electronic device according to an embodiment of the present invention.

FIG. 18 is a control flowchart of an electronic device according to an embodiment of the present invention.

FIG. 19 is a perspective view of a main body according to another embodiment of the present invention.

FIG. 20 is a view illustrating a coupling part of a band part according to another embodiment of the present invention.

BEST MODE

Figure 1:
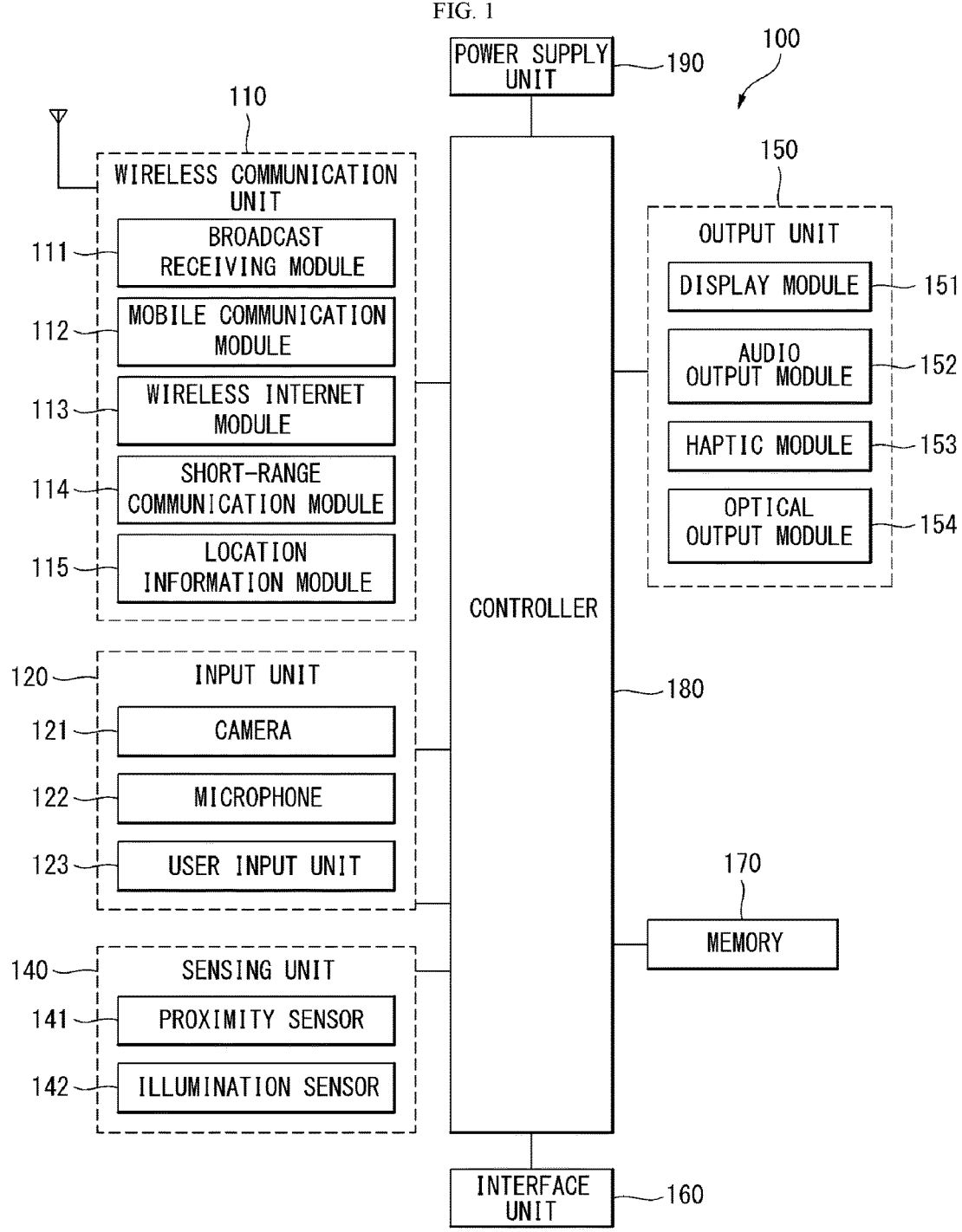
FIG. 1 is a view illustrating an electronic device according to an embodiment of the present invention.

Hereinafter, exemplary embodiments of the present invention will be described in detail with reference to the accompanying drawings. Regardless of the numerals in the drawings, for parts equivalent to and similar to the configurations described above, the same reference numerals will be assigned, and detailed descriptions thereof will be omitted. The suffix such as "module" and "part" for constituent elements used in the following description are given or mixed in consideration of ease of specification writing only, and do not have their own distinctive meanings or roles.

Also, detailed descriptions related to well-known functions or configurations will be ruled out in order not to unnecessarily obscure subject matters of the present invention. In addition, the present invention is not limited to a specific implementation type, but should be construed as including all modifications, equivalents, and substitutes involved in the spirit and the technical scope of the present invention.

The terms including ordinal number such as "a first/the first" and "a second/the second" may be used to describe various components, but the components will not be limited by the terms. The terms are used only in order to distinguish one component from another component.

It should be understood that when an element is referred to as being "connected" or "coupled" to another element, it may be directly connected or coupled to the other element but another element may also be interposed therebetween. On the other hand, when an element is referred to as being "directly connected" or "directly coupled" to another element, it should be understood that there are no other elements in between.

The terms of a singular form may include plural forms unless referred to the contrary.

In this disclosure, the terms "include," "comprise," or "have" specifies features, numbers, steps, operations, elements or combinations thereof, but do not exclude existence or addition possibility of one or more other features, numbers, steps, operations, elements or combinations thereof.

The electronic devices described herein may include a mobile phone, a smart phone, a laptop computer, a digital broadcasting terminal, a personal digital assistant (PDA), a portable multimedia player (PMP), a navigation device, a slate PC, a tablet PC, an ultrabook, a wearable device (e.g., a smartwatch, a smart glass, a head mounted display (HMD), etc.).

However, it will be readily apparent to those skilled in the art that configurations in accordance with embodiments described herein may be applied to fixed terminals such as digital TVs, desktop computers, digital signage, and the like except a case of being applicable only to electronic devices.

FIG. 1 is a view illustrating an electronic device according to an embodiment of the present invention.

An electronic device 100 may include a wireless communication unit 110, an input unit 120, a sensing unit 140, an output unit 150, an interface unit 160, a memory 170, a controller 180, and a power supply unit 190. Since the components shown in FIG. 1 are not essential for implementing an electronic device, the electronic device described herein may have more or fewer components than the components listed above.

More specifically, the wireless communication unit 110 among the above-described components may include one or more modules which enable wireless communication between the electronic device 100 and a wireless communication system, between the electronic device 100 and another electronic device 100, or between the electronic device 100 and an external server. In addition, the wireless communication unit 110 may include one or more modules that connect the electronic device 100 to one or more networks.

The wireless communication unit 110 may include at least one of a broadcast receiving module 111, a mobile communication module 112, a wireless Internet module 113, a short range communication module 114, and a location information module 115.

The input unit 120 may include a camera 121 or an image input unit for inputting image signals, a microphone 122 or an audio input unit for inputting audio signals, and a user input unit (e.g., a touch key, a mechanical key, and the like) 123 for receiving information from a user. The voice data or image data collected by the input unit 120 may be analyzed and processed by a user's control command.

The sensing unit 140 may include at least one sensor for sensing at least one of the information in the electronic device, the surrounding environment information around the electronic device, and the user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared sensor, a finger scan sensor, an ultrasonic sensor, a optical sensor (e.g., a camera 121), a microphone 122, a battery gauge, an environmental sensor (e.g., a barometer, a hygrometer, a thermometer, a radiation detection sensor, a heat sensor, a gas sensor, etc.), and a chemical sensor (e.g., an electronic nose, a healthcare sensor, a biometric sensor, etc.). Meanwhile, the electronic device disclosed herein can combine and use information sensed by at least two of such sensors.

The output unit 150 may include at least one of a display unit 151, a sound output unit 152, a haptic module 153, and a light output unit 154 to generate outputs related to sight, hearing or touch. The display unit 151 may have a mutual layer structure with a touch sensor, or may be integrally formed with a touch sensor to implement a touch screen. Such a touch screen may function as a user input 123 that provides an input interface between the electronic device 100 and a user, and may provide an output interface between the electronic device 100 and a user.

The interface unit 160 may serve as a channel with various kinds of external devices connected to the electronic device 100. The interface unit 160 may include at least one of a wired/wireless headset port, an external charger port, a wired/wireless data port, a memory card port, a port connecting a device including an identification module, an audio I/O port, a video I/O port, and an earphone port. In accordance with the connection of an external device to the interface unit 160, the electronic device 100 may perform appropriate control related to the connected external device.

Also, the memory 170 may store data that supports various functions of the electronic device 100. The memory 170 may store a plurality of application programs (application programs or applications) that are executed in the electronic device 100, and data and commands for operation of the electronic device 100. At least a portion of these applications may be downloaded from an external server via wireless communication. Also, at least a portion of these applications may exist on the electronic device 100 from the time of shipment to perform the basic functions (e.g., phone call incoming and outgoing, and message receiving and sending) of the electronic device 100. On the other hand, the application program may be stored in the memory 170, may be installed in the electronic device 100, and may be driven by the controller 180 so as to perform the operation (or function) of the electronic device 100.

In addition to the operations associated with the application program, the controller 180 may typically control the overall operation of the electronic device 100. The controller 180 may process signals, data, and information which are inputted or outputted through the above-mentioned components, or may provide or process appropriate information or functions for a user by executing application programs stored in the memory 170. In addition, the controller 180 may control at least a portion of the components illustrated in FIG. 1 to drive an application program stored in the memory 170. Furthermore, the controller 180 may operate at least two of the components included in the electronic device 100 in combination with each other in order to drive the application program.

The power supply unit 190 may receive external power and internal power under the control of the controller 180, and may supply power to the components included in the electronic device 100. The power supply unit 190 may include a battery, and the battery may be an embedded battery or a replaceable battery.

At least a portion of the respective components may operate in cooperation with each other to implement the operation, control, or control method of electronic devices according to various embodiments described below. Also, the operation, control, or control method of the electronic devices may be implemented on the electronic device by driving of at least one application program stored in the memory 170.

Hereinafter, the components described above will be described in more detail with reference to FIG. 1 prior to explaining various embodiments implemented through the electronic device 100 as described above.

First, referring to the wireless communication unit 110, the broadcast receiving module 111 of the wireless communication unit 110 may receive broadcast signals and/or broadcast-related information from an external broadcast management server through a broadcast channel. The broadcast channel may include a satellite channel and a terrestrial channel. Two or more broadcast receiving modules may be provided to the mobile terminal 100 for simultaneous broadcast reception or broadcast channel switching of at least two broadcast channels.

The mobile communication module 112 may transmit/ receive at least one of a base station, an external terminal, and a server on a mobile communication network built in accordance with technology standards or communication methods (e.g., Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.) for mobile communication.

The wireless signal may include various types of data according to transmission/reception of a voice call signal, a video call signal or a text/multimedia message.

The wireless Internet module 113 may refer to a module for wireless Internet access, and may be embedded in or may enclose the electronic device 100. The wireless Internet module 113 may be configured to transmit and receive wireless signals in a communication network according to wireless Internet technologies.

Examples of the wireless Internet technologies may include, for example, Wireless LAN (WLAN), Wireless Fidelity (Wi-Fi), Wireless Fidelity (Wi-Fi) Direct, Digital Living Network Alliance (DLNA), Wireless Broadband (WiBro), World Interoperability for Microwave Access (Wi-MAX), High Speed Downlink Packet Access (HSDPA), High Speed Uplink Packet Access (HSUPA), Long Term Evolution (LTE), and Long Term Evolution-Advanced (LTE-A). The wireless Internet module 113 may transmit and receive data in accordance with at least one wireless Internet technology in a range including even Internet technologies that are not described above.

The wireless Internet module 113 for performing wireless Internet connection through the mobile communication network may also be understood as a kind of the mobile communication module 112 in that wireless Internet access by WiBro, HSDPA, HSUPA, GSM, CDMA, WCDMA, LTE and LTE-A is performed through a mobile communication network.

The short range communication module 114 may be for short range communication, and may support short range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies. The short range communication module 114 may support wireless communication between the electronic device 100 and the wireless communication system through the wireless area networks, between the electronic device 100 and another electronic device 100, or between the electronic device 100 and a network where another electronic device (or external server) 100 is located. The short range wireless communication network may be a wireless personal area network.

Here, the other electronic devices 100 may include a wearable device (e.g., a smartwatch, a smart glass, and a Head Mounted Display (HMD)) capable of interchanging (or interworking) data with the electronic device 100 according to the embodiment of the present invention. The short range communication module 114 may detect (or recognize) a wearable device capable of communicating with the electronic device 100 around the electronic device 100. Furthermore, when the detected wearable device is an authorized device to communicate with the electronic device 100 according to this embodiment, the controller 180 may transmit at least a portion of the data processed in the electronic device 100 to the wearable device via the short range communication module 114. Accordingly, a user of the wearable device can use the data processed in the electronic device 100 through the wearable device. For example, when a telephone call is received to the electronic device 100, a user may perform a telephone call through the wearable device, or when a message is received to the electronic device 100, a user may confirm the received message via the wearable device.

The location information module 115 may be a module for obtaining the location (or current location) of the electronic device, and representative examples thereof may include a Global Positioning System (GPS) module and a Wireless Fidelity (WiFi) module. For example, when the electronic device may utilize a GPS module to obtain the location of the electronic device using a signal sent from a GPS satellite. As another example, the electronic device may utilize a Wi-Fi module to obtain the location of an electronic device based on information of a Wireless Access Point (wireless AP) that transmits or receives a wireless signal to or from the Wi-Fi module. According to a need, the location information module 115 may substitutionally or additionally perform any function of the other modules of the wireless communication unit 110 to obtain data on the location of the electronic device. The location information module 115 may be a module used to obtain the location (or current location) of the electronic device, and is not limited to a module that directly calculates or obtains the location of the electronic device.

Next, the input unit 120 may be for inputting image information (or signal), audio information (or signal), data, or information inputted from a user. For inputting of image information, the electronic device 100 may include one or more cameras 121. The camera 121 may process an image frame such as a still image or a video obtained by an image sensor in the video call mode or the photographing mode. The processed image frame may be displayed on the display unit 151, or may be stored in the memory 170. A plurality of cameras 121 provided in the electronic device 100 may be arranged to form a matrix structure. A plurality of pieces of image information having various angles or focuses may be inputted into the electronic device 100 through the cameras 121 forming the matrix structure. In addition, the plurality of cameras 121 may be arranged in a stereo structure so as to acquire a left image and a right image for implementing a stereoscopic image.

The microphone 122 may process an external acoustic signal into electrical voice data. The processed voice data may be variously utilized according to functions (or application programs being executed) being performed in the electronic device 100. Meanwhile, the microphone 122 may be implemented with various noise reduction algorithms for removing noise generated in a process of receiving external sound signals.

When information is inputted through the user input unit 123, the controller 180 may control the operation of the electronic device 100 so as to correspond to the inputted information. The user input unit 123 may include a mechanical input unit (or a mechanical key, e.g., a button, a dome switch, a jog wheel, Jog switch, etc. located on the front, rear or side surface of the electronic device 100) and touch-type input unit. For example, the touch-type input unit may include a virtual key, a soft key or a visual key displayed on the touch screen through a software process, or may include a touch key disposed on a portion other than the touch screen. Meanwhile, the virtual key or the visual key may be displayed on a touch screen while having various forms, for example, a graphic, a text, an icon, a video, or a combination thereof.

Meanwhile, the sensing unit 140 may sense at least one of the information in the electronic device, the surrounding environment information around the electronic device, and the user information, and may generate a sensing signal corresponding thereto. Based on the sensing signal, the controller 180 may control driving or operation of the electronic device 100, or may perform data processing, function or operation related to the application program installed in the electronic device 100. Representative sensors among various sensors that may be included in the sensing unit 140 will be described in more detail.

First, the proximity sensor 141 may refer to a sensor that detects the presence of an object approaching a predetermined detection surface or an object existing in the vicinity thereof without a mechanical contact using a force of electromagnetic field or infrared rays. The proximity sensor 141 may be disposed in the inner region of the electronic device covered by the touch screen described above or near the touch screen.

Examples of the proximity sensor 141 may include a transmission type photoelectric sensor, a direct reflection type photoelectric sensor, a mirror reflection type photoelectric sensor, a high frequency oscillation type proximity sensor, an electrostatic capacity type proximity sensor, a magnetic proximity sensor, and an infrared proximity sensor. When the touch screen is electrostatic, the proximity sensor 141 may be configured to detect the proximity of an object using the change of the electric field according to the proximity of the object having conductivity. In this case, the touch screen (or touch sensor) itself may be classified into a proximity sensor.

On the other hand, for convenience of explanation, the act of recognizing that an object is located on the touch screen while the object is not in contact with the touch screen may be referred to as proximity touch, and the act of an object making actual contact with the touch screen may be referred to as contact touch. The location at which an object is in proximity touch over the touch screen may mean a location where the object is vertically aligned with the touch screen when the object is in proximity touch. The proximity sensor 141 may detect a proximity touch and a proximity touch pattern (e.g., a proximity touch distance, a proximity touch direction, a proximity touch speed, a proximity touch time, a proximity touch location, and a proximity touch moving state). Meanwhile, the controller 180 may process data (or information) corresponding to the proximity touch operation and the proximity touch pattern sensed through the proximity sensor 141 as described above, and may further output visual information corresponding to the processed data on the touch screen. Furthermore, the controller 180 may control the electronic device 100 such that different operations or data (or information) are processed according to whether a touch with respect to the same point on the touch screen is a proximity touch or a contact touch.

The touch sensor may sense a touch (or touch input) applied to the touch screen (or the display unit 151) using at least one of various touch methods such as a resistance film type, an electrostatic capacity type, an infrared type, an ultrasonic type, and a magnetic field type.

For example, the touch sensor may be configured to convert a change in a pressure applied to a specific portion of the touch screen or an electrostatic capacity generated in a specific portion into an electrical input signal. The touch sensor may be configured to detect a touch location, a touch area, a touch pressure, an electrostatic capacity at the time of touch when a touch object is touched on the touch screen. Here, the touch object may be an object applying a touch to the touch sensor, and may be a finger, a touch pen, a stylus pen, a pointer, or the like.

Thus, when there is a touch input to the touch sensor, the corresponding signal(s) may be sent to a touch controller. The touch controller may process the signal(s), and then may transmit the corresponding data to the controller 180. Thus, the controller 180 may know which area of the display unit 151 is touched. Here, the touch controller may be a separate component from the controller 180, and may be the controller 180 itself.

On the other hand, the controller 180 may perform different controls or perform the same control according to the type of the touch object which touches the touch screen (or a touch key other than the touch screen). Whether to perform different controls or to perform the same control according to the type of the touch object may be determined according to the current operation state of the electronic device 100 or an application program that is being executed.

On the other hand, the touch sensor and the proximity sensor described above may be operated independently or in combination, and may sense various types of touches such as a short touch (or tap), a long touch, a multi touch, a drag touch, flick touch, pinch-in touch, pinch-out touch, swipe touch, and hovering touch.

The ultrasonic sensor may recognize the location information of an object to be sensed by using ultrasonic waves. Meanwhile, the controller 180 may calculate the location of a wave source through the information sensed by the optical sensor and a plurality of ultrasonic sensors. The location of the wave source may be calculated using the fact that light is much faster than an ultrasonic wave, i.e., the time that light reaches the optical sensor is much faster than the time that the ultrasonic wave reaches the ultrasonic sensor. More specifically, the location of the wave source may be calculated using a time difference with the time when an ultrasonic wave arrives based on light as a reference signal.

The camera 121 described as a component of the input unit 120 may include at least one of a camera sensor (e.g., a CCD, a CMOS, etc.), a photo sensor (or an image sensor), and a laser sensor.

The camera 121 and the laser sensor may be combined with each other to sense a touch of a sensed object with respect to the three-dimensional stereoscopic image. The photo sensor may be laminated in the display element, and may be arranged to scan the movement of a sensed object proximate to the touch screen. More specifically, the photo sensor may be mounted with a photo diode and a transistor (TR) in a row/column, and may scan the contents placed on the photo sensor using an electrical signal that varies according to the amount of light applied to the photo diode. That is, the photo sensor may perform coordinate calculation of an object to be sensed according to the changed amount of light. Thus, the location information of the object to be sensed may be obtained through the coordinate calculation.

The display unit 151 may display (output) information processed in the electronic device 100. For example, the display unit 151 may display execution screen information of an application program driven in the electronic device 100, or User Interface (UI) and Graphic User Interface (GUI) information according to the execution screen information.

In addition, the display unit 151 may be configured as a stereoscopic display unit for displaying a stereoscopic image.

In the stereoscopic display unit, a three-dimensional display system such as a stereoscopic system (spectacles system), an auto stereoscopic system (non-spectacles system), and a projection system (holographic system) may be applied.

The sound output unit 152 may output audio data stored in the memory 170 or received from the wireless communication unit 110 in a call signal reception mode, a call mode or a recording mode, a voice recognition mode, and a broadcast reception mode. The sound output unit 152 may also output sound signals related to functions (e.g., call signal reception sound, message reception sound, etc.) performed in the electronic device 100. The sound output unit 152 may include a receiver, a speaker, a buzzer, and the like.

The haptic module 153 may generate various tactile effects that a user can feel. A typical example of the haptic effects generated by the haptic module 153 may be vibration. The intensity and pattern of vibration generated in the haptic module 153 may be controlled by the user's selection or the setting of the controller. For example, the haptic module 153 may synthesize and output different vibrations, or may sequentially output different vibrations.

In addition to vibration, the haptic module 153 may generate various tactile effects such as a pin arrangement vertically moving with respect to the contact skin surface, a spraying force or suction force of air through the injection port or the suction port, a touch on the skin surface, a contact of an electrode, a stimulus by an electrostatic force, and cooling/warming sensation using a heat absorbing or emitting element.

The haptic module 153 may deliver a tactile effect through a direct contact, and may also be implemented such that a user may feel a tactile effect through a muscular sensation of a finger or an arm. At least two haptic modules 153 may be provided according to the configuration of the electronic device 100.

The light output unit 154 may output a signal for informing occurrence of an event using light of a light source of the electronic device 100. Examples of events that occur in the electronic device 100 may include message reception, call signal reception, missed calls, alarm, schedule notification, email reception, information reception through an application, and the like.

The signal outputted by the light output unit 154 may be implemented as the electronic device emits light of a single color or lights of a plurality of colors to the front or rear surface of the electronic device. The signal output may be terminated when the electronic device senses an event confirmation of a user.

The interface unit 160 may serve as a channel with all external devices connected to the electronic device 100. The interface unit 160 may receive data or power from an external device, and then may deliver data and power to each component in the electronic device 100. Also, the interface unit 160 may transmit data inside the electronic device 100 to an external device. For example, the interface unit 160 may include a wired/wireless headset port, an external charger port, a wired/wireless data port, a memory card port, a port connecting a device including an identification module, an audio I/O port, a video I/O port, and an earphone port.

The identification module may be a chip that stores various kinds of information for authenticating the usage right of the electronic device 100, and may include a user identification module (UIM), a subscriber identity module (SIM), a universal subscriber identity module (USIM), and the like. Devices (hereinafter, referred to as "identification devices") including identification modules may be manufactured in a smart card format. Accordingly, the identification device may be connected to the terminal 100 through the interface unit 160.

Also, when the electronic device 100 is connected to an external cradle, the interface unit 160 may become a path through which power from the cradle is supplied to the electronic device 100, or may become a path through which various command signals inputted from the cradle are transmitted to the electronic device 100. Various command signals or power inputted from the cradle may serve as a signal for recognizing that the electronic device 100 is correctly mounted on the cradle.

The memory 170 may store a program for the operation of the controller 180, and may temporarily store inputted/outputted data (e.g., a phone book, a message, a still image, a video, etc.). The memory 170 may store data on various patterns of vibration and sound outputted when a touch is inputted on the touch screen.

The memory 170 may include at least one storage medium of a flash memory type, a hard disk type, a solid state disk type (SSD), a silicon disk drive type (SDD), a multimedia card micro type and a card type (e.g., SD or XD memory) memories, a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The electronic device 100 may also operate in association with a web storage that performs a storage function of the memory 170 on the Internet.

Meanwhile, as described above, the controller 180 may control the operation related to the application program, and may typically control the overall operation of the electronic device 100. For example, when the state of the electronic device satisfies set conditions, the controller 180 may execute or release a lock state that restricts an input of a user's control command for applications.

In addition, the controller 180 may perform control and processing related to voice call, data communication, video call and the like, or may perform pattern recognition processing through which a handwriting input or drawing input performed on the touch screen can be recognized as characters and images, respectively. Furthermore, the controller 180 may control any one or a plurality of the above-described components in order to implement various embodiments described below on the electronic device 100 according to an embodiment of the present invention.

The power supply unit 190 may receive external power and internal power under the control of the controller 180, and may supply power necessary for operation of the respective components. The battery may be an embedded battery configured to be chargeable, and may be detachably coupled to the terminal body for charging or the like.

Also, the power supply unit 190 may include a connection port, and the connection port may be configured as an example of the interface 160 to which an external charger for supplying power to charge the battery is electrically connected.

As another example, the power supply unit 190 may be configured to charge the battery in a wireless manner without the connection port. In this case, the power supply unit 190 may receive power from an external wireless power transmission apparatus using at least one of an inductive coupling method based on a magnetic induction phenomenon and a magnetic resonance coupling method based on an electromagnetic resonance phenomenon.

Hereinafter, various embodiments may be implemented in a recording medium readable by a computer or a device similar thereto, using, for example, software, hardware, or a combination thereof.

On the other hand, the electronic device may be extended to wearable devices that can be worn on the body in addition to devices that a user holds mainly in the hand. Examples of these wearable devices may include smart watches, smart glasses, and head mounted displays (HMD). Hereinafter, examples of electronic devices extended to wearable devices will be described.

The wearable device may be configured to be capable of interchanging (or interlocking) data with another electronic device 100. The short range communication module 114 may detect (or recognize) a wearable device capable of communicating around the electronic device 100. Furthermore, when the detected wearable device is an authorized device to communicate with the electronic device 100, the controller 180 may transmit at least a portion of the data processed in the electronic device 100 to the wearable device via the short range communication module 114. Accordingly, a user may use the data processed in the electronic device 100 through the wearable device. For example, when a telephone call is received to the electronic device 100, a user may perform a telephone call through the wearable device, or when a message is received to the electronic device 100, a user may confirm the received message via the wearable device. At least a portion of the respective components may operate in cooperation with each other to implement the operation, control, or control method of the electronic device 100 according to various embodiments described below. Also, the operation, control, or control method of the electronic device 100 may be implemented by driving of at least one application program stored in the memory 170.

Figure 2:
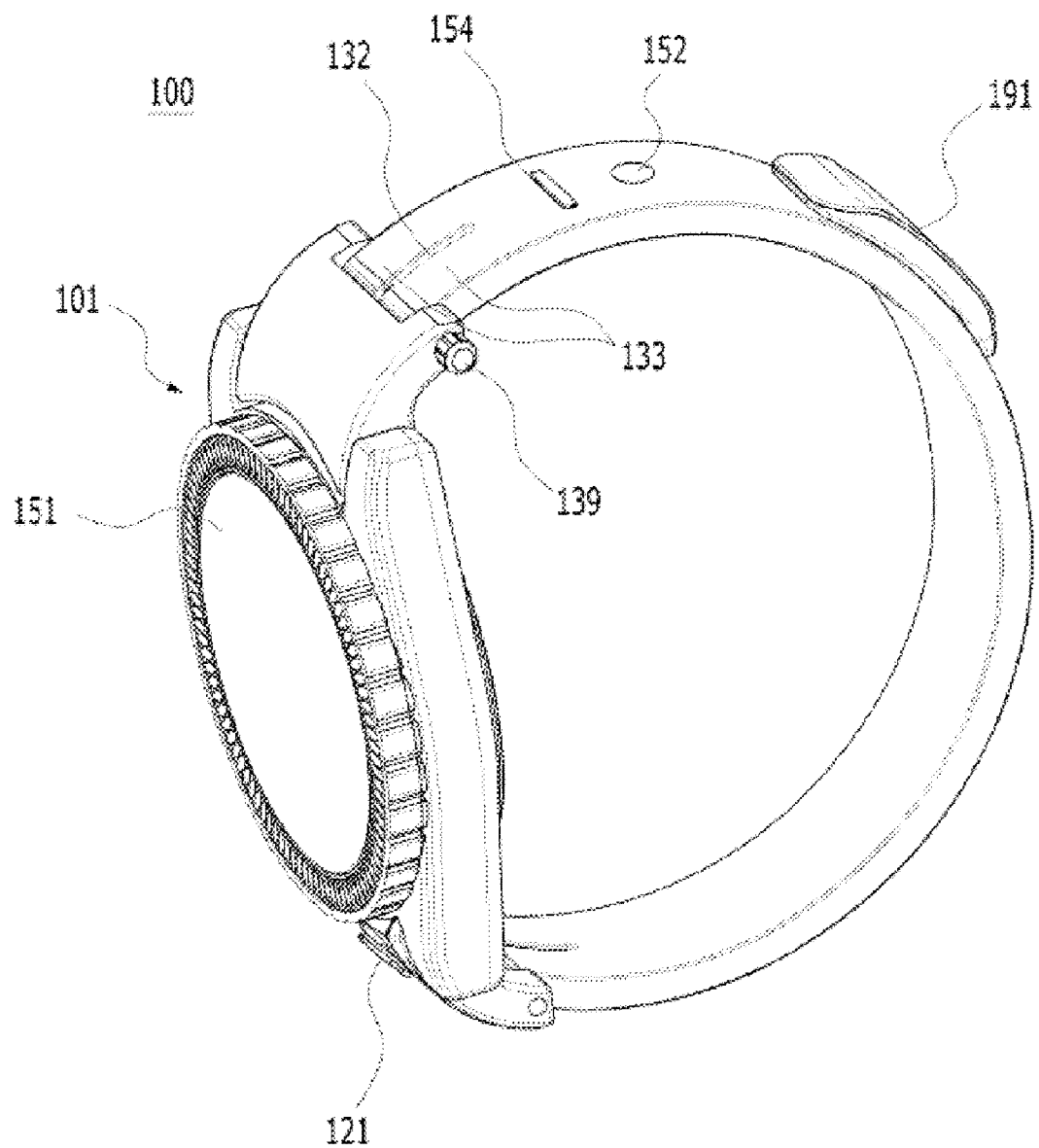
FIG. 2 is a perspective view illustrating an electronic device according to an embodiment of the present invention.
Figure 3:
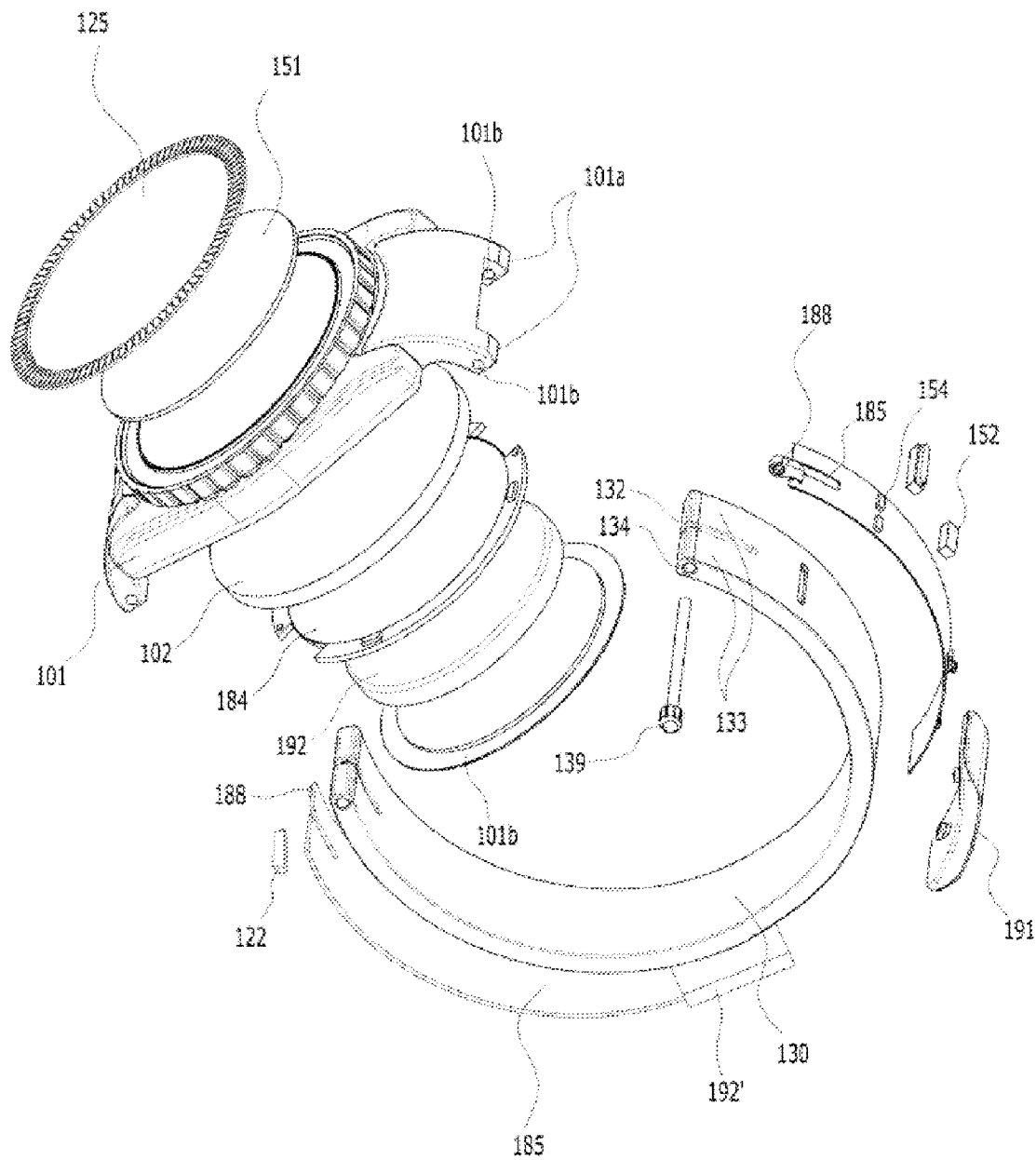
FIG. 3 is an exploded perspective view of the electronic device of FIG. 2.

The watch-type electronic device 100 may be a type of mobile terminal, and may be a mobile terminal that is worn around the wrist of a user. The watch-type electronic device 100 may include some or all of the above-described configurations, and features related to the shape of the watch-type electronic device 100 will be described with reference to the drawings. FIG. 2 is a perspective view of an electronic device according to an embodiment of the present invention, and FIG. 3 is an exploded perspective view of the electronic device of FIG. 2.

The electronic device according to this embodiment may include a band part 130 including a curved surface in the longitudinal direction or including a flexible material, and may be detachably attached to the main body 101 using the hinge pin 139.

The band part 130 may be formed to have a curved surface when being formed of a rigid material, or may be formed of a flexible material. The band part 130 may be worn on the user's wrist. The band part 130 may be provided with an electronic part in which electronic parts may be mounted, and a band board 185, a sound output unit 152, a microphone 122, a light output unit 254 and an antenna (not shown) may be mounted in the electronic part.

Figure 4B:
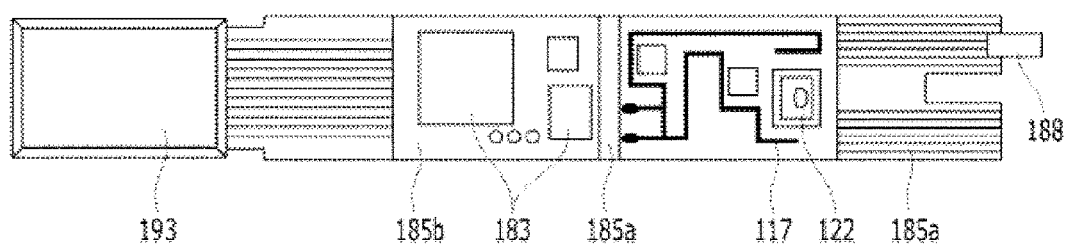

FIGS. 4A and 4B are plan views illustrating a band board 185 of an electronic device according to an embodiment of the present invention, and the band board 185 may include a flexible board that is bent. As shown in FIGS. 4A and 4B, the board of a hard material may be formed of a plurality of pieces, and a flexible board may be interposed therebetween. Also, the whole of the band board 185 may be formed of a flexible material.

The band board 185 may be mounted with an IC 183 controlling the sound output unit 152, the microphone 122, the light output unit 254 and the wireless communication unit 110 which are mounted on the band part 130, and the IC 183 may control the main body 101 when connected to the main body 101. The sound output unit 152, the microphone 122, the light output unit 254 and the antenna 117 may be mounted on the band part 130 separately from the band board 185, but may also be mounted on the band board 185 as shown in FIGS. 4A and 4B.

The band board 185 located on one side and the other side of the band part 130 may be separated from each other as shown in FIG. 3, and both ends of the band board 185 may also be connected to form a single band board 185. Even though the band boards 185 are separated from each other, the separated band boards 185 may be connected when the end portion of the band part 130 is connected to the main body 101 or when the end portions of the band part 130 are connected to each other.

The sound output unit 152, the light output unit 254 and the IC 183 are located on one side of the band board 185, and a terminal for connecting to the external battery 191 may be located. The microphone 122, the antenna 117, the IC 183, and the embedded battery 193 may be mounted on the other side of the band board 185. The above-mentioned arrangement may be changed, and more components may be mounted in addition to the above configuration.

A slit 132 extending in the longitudinal direction of the band part 130 may be located at the end operation of the band part 130. In this embodiment, the slit 132 may be formed at each end portion of the band part 130, and both ends of the band part 130 may be divided into two divided end portions 133. When the number of the slits 132 is plural, the number of the divided end portions 133 also increases.

Even when the band part 130 is formed of a rigid material, the divided end portion 133 may be formed of a flexible material. The divided end portion 133 may be bent up and down in the thickness direction of the band part 130, and the divided end portions 133 defined by the slit 132 may be bent in different directions.

A coupling hole 134 extending in the width direction from the end portion of the band part 130, that is, the side surface of the divided end portion 133 may be further provided. A hinge pin 139 is coupled to the coupling hole 134 for coupling with the main body 101. The main body 101 may include a hinge hole 101b through which the hinge pin 139 passes.

The hinge pin 139 passing through the band part 130 may be formed of a conductive material, and may be electrically connected to a connection ring 188 located inside the coupling hole 134 and the hinge hole 101b. The connection ring 188 may be a ring-shaped member formed of a conductive material provided inside the coupling hole 134 of the band part 130. The end portion of the connection ring 188 may be connected to the band board 185 mounted in the band part 130.

A clock face 102 including a time scale and an hour hand and a second hand which indicate time may be disposed at the front surface of the main body 101. The main part 130 may include band coupling portions 101a disposed at both sides thereof and coupled to the band part 130 through the hinge pin 139. The band coupling portion 101a may include a pair of coupling protrusions of the band part 130 spaced from each other by a distance corresponding to the width of the band part 130, and a hinge hole 101b formed in the coupling protrusion of the band part 130. The hinge pin 139 may be inserted into the hinge hole 101b to fasten the body part 101 and the band part 130 as described above.

The main body 101 may be a watch body having only a normal wristwatch function. The typical watch may also include a band coupling portion 101a for replacing a line of a watch, and a band part 130 may be replaced using a hinge pin 139 in a hinge hole 101b of the band coupling portion 101a. Accordingly, the electronic device according to this embodiment may be coupled to the normal main body 101 as well.

A battery 192 may be provided to drive the clock face 102 even in the case of the main body 101 in which no separate electronic component is mounted. The battery 192 may be used only for driving of the clock face 102, and when the electronic components provided in the band part 130 are driven and the display part 151 is further coupled, the driving of the display part 151 may be performed by a battery provided in the band part 130 itself.

Alternatively, as shown in FIG. 3, the main body 101 having the electronic components mounted therein may be used. The main body 101 may include a display unit 151, a circuit unit 184 for control, and a main battery 192 for supplying power. As shown in FIG. 3, the main body 101 may include a configuration like the camera 121 that is not provided in the electronic device.

The display unit 151 may become opaque/translucent only when information is displayed through the display unit 151 while the display unit 151 is in a transparent state when used as a normal clock. A touch sensor 125 may be further provided on the front surface of the display unit 151 to simultaneously perform input and output operations.

Thus, when the electronic components are mounted in the main body 101 as well, a connection ring 188 may also be provided inside the hinge hole 101b for electrical connection with the electronic components, thereby enabling connection to the circuit unit 184 inside the main body 101 through the connection ring 188. The function may be expanded by connecting the main body 101 and the band part 130.

For example, in the case where only the display function is provided in the main body unit 101, if the band part 130 may be connected, then wireless communication with a base station using the antenna 117 provided in the band part 130, or call or data transmission/reception through near field communication may be enabled. Also, acoustic information may be together outputted through the sound output module 152 provided in the band part 130.

In addition to connection to the main body 101 through the end of the band part 130, it may be possible to be connected to an external power source through a hinge pin 139 to receive power, or may be possible to be connected to an external terminal such as a computer. As described with reference to in FIG. 1, short range communication technologies such as a Bluetooth™, a Radio Frequency Identification (RFID), an Infrared Data Association (IrDA), an Ultra Wideband (UWB), a ZigBee, a Near Field Communication (NFC), and Wireless Universal Serial Bus (Wireless USB) may be applied to the electronic device according to an embodiment of the present invention.

Among them, the NFC module provided in the electronic device may support the non-contact type short range wireless communication between terminals at a distance of about 10 cm. The NFC module may operate in either a card mode, a reader mode, or a P2P mode. In order for the NFC module to operate in the card mode, the electronic device 100 may further include a security module for storing card information. Here, the security module may be a physical medium such as a Universal Integrated Circuit Card (UICC; e.g., a Subscriber Identification Module (SIM) or a Universal SIM (USIM)), a Secure micro SD and a sticker, and may also be a logical medium (e.g., an embedded Secure Element (SE)) that is embedded in an electronic device. Data exchange based on Single Wire Protocol (SWP) may be performed between the NFC module and the security module.

When the NFC module is operated in the card mode, the electronic device may deliver the stored card information to the outside like a typical IC card. Specifically, when an electronic device storing card information of a payment card such as a credit card or a bus card is brought closely to a charge settlement apparatus, the mobile short-range payment may be processed, and when an electronic device storing card information of an access card is brought closely to an access authorization apparatus, the approval process for access may begin. Cards such as a credit card, a transportation card, and an access card may be mounted in the security module in a form of applet, and the security module may store card information on the mounted card. Here, the card information of the payment card may include at least one of a card number, balance, and use details, and the card information of the access card may include at least one of a user's name, a number (e.g., ID numbers in school or company), and access details.

When the NFC module is operated in the reader mode, the electronic device may read data from an external tag. In this case, data received from the tag by the electronic device may be coded into a data exchange format (NFC Data Exchange Format) defined by the NFC Forum. In addition, the NFC Forum defines four record types. Specifically, the NFC Forum regulates four Record Type Definitions (RTDs) such as Smart Poster, Text, Uniform Resource Identifier (URI), and General Control. When the data received from the tag is a smart poster type, the controller may execute a browser (e.g., an Internet browser), and when the data received from the tag is a text type, the controller may execute a text viewer. When the data received from the tag is a URI type, the controller may executes a browser or make a telephone call, and when the data received from the tag is a general control type, the controller may execute appropriate operations according to the control contents.

When the NFC module is operated in peer-to-peer mode, the electronic device may perform P2P communication with another electronic device. In this case, Logical Link Control Protocol (LLCP) may be applied to the P2P communication. For P2P communication, a connection may be generated between the electronic device and another electronic device. In this case, the generated connection may be divided into a connectionless mode in which one packet is exchanged and terminated, and a connection-oriented mode in which packets are continuously exchanged. Through P2P communication, data such as electronic forms of business cards, contact information, digital photos, URLs, and setup parameters for Bluetooth and Wi-Fi connection may be exchanged. However, since the usable distance of NFC communication is short, the P2P mode may be effectively used to exchange small-sized data.

Hereinafter, embodiments related to a control method that can be implemented in the electronic device configured as above will be described with reference to the accompanying drawings. It will be apparent to those skilled in the art that the present invention may be embodied into other specific forms without departing from the spirit or essential characteristics thereof.

Figure 5:
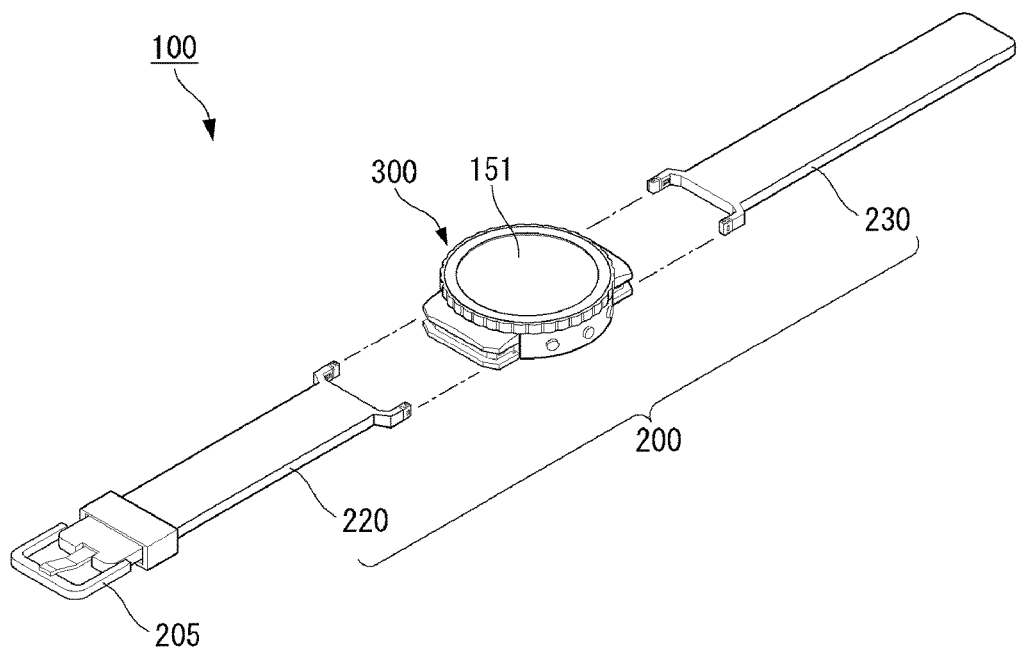
FIG. 5 is a perspective view illustrating another exterior of an electronic device according to an embodiment of the present invention.

FIG. 5 is a perspective view illustrating another exterior of a watch-type electronic device according to an embodiment of the present invention.

Referring to FIG. 5, an electronic device according to an embodiment of the present invention may include a main body 300 and a band part 200 detachably coupled to the main body 300.

The main body 300 may be a part including a display 151 of the electronic device 100. That is, the main body 300 may be a part that performs a function of displaying information on the display 151 by including a main board mounted with various electronic elements, performing communication, and processing information.

The main body 300 may be provided with various input units for operating the electronic device 100. For example, at least one user input button 123 may be provided on the front surface or side surface of the main body 300. The display 151 located on the front surface of the main body 300 may receive a user's touch operation.

The band part 200 may be a part that is coupled to the main body 300 and coupled to a user's wrist or the like. The main body 300 and the band part 200 may have a shape corresponding to the shape of the user's wrist. For example, the rear side of the main body 300 may be curved to correspond to the shape of the user's wrist, and the band part 200 may be formed into a user's wrist shape and/or may be formed of a naturally curved material. At the end of the band part 200, a buckle 205 capable of coupling the first and second band parts 220 and 230 may be provided.

The band part 200 may be detachably coupled to the main body 300. For example, each of the first and second band parts 220 and 230 may have a shape in which one side thereof may be coupled to or separated from the main body 300, or the first and second band parts 220 and 230 may be formed into a single band, allowing both ends of the single band to be coupled to or separated from the main body 300.

The band part 200 may be formed to have a curved surface when being formed of a rigid material, or may be formed of a flexible material. The band part 200 may be formed of a synthetic resin, a metal, a natural/artificial leather material, a material having a high elasticity, or a combination thereof, and may be configured to provide a waterproof function for the main body 300.

The band part 200 may be provided with an electronic part in which electronic parts may be mounted, and a band board 185, a sound output unit 152, a microphone 122, a light output unit 254 and an antenna (not shown) may be mounted in the electronic part.

At least one of coupling regions of the band part 200 and the body region 300 may be formed of a conductive material such that a circuit part disposed in the main body 200 and an electronic part disposed in the band part 200 are electrically connected to each other when the band part 200 and the main body 300 are connected to each other.

Figure 6:
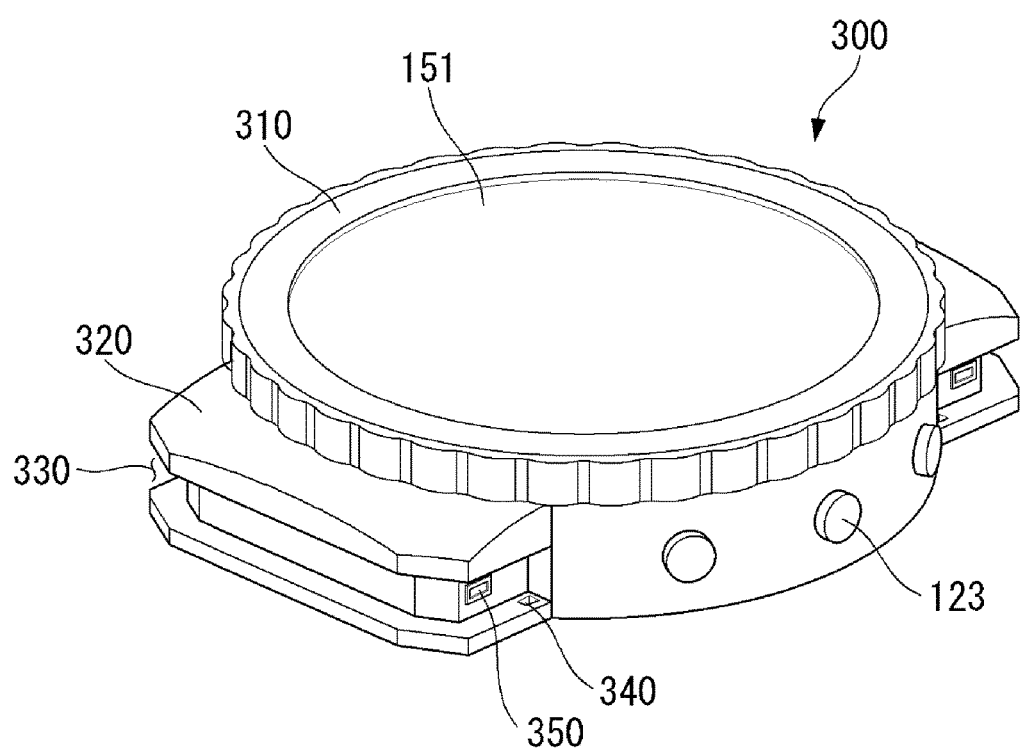
FIG. 6 is a perspective view illustrating a main body of the electronic device of FIG. 5.
Figure 7:
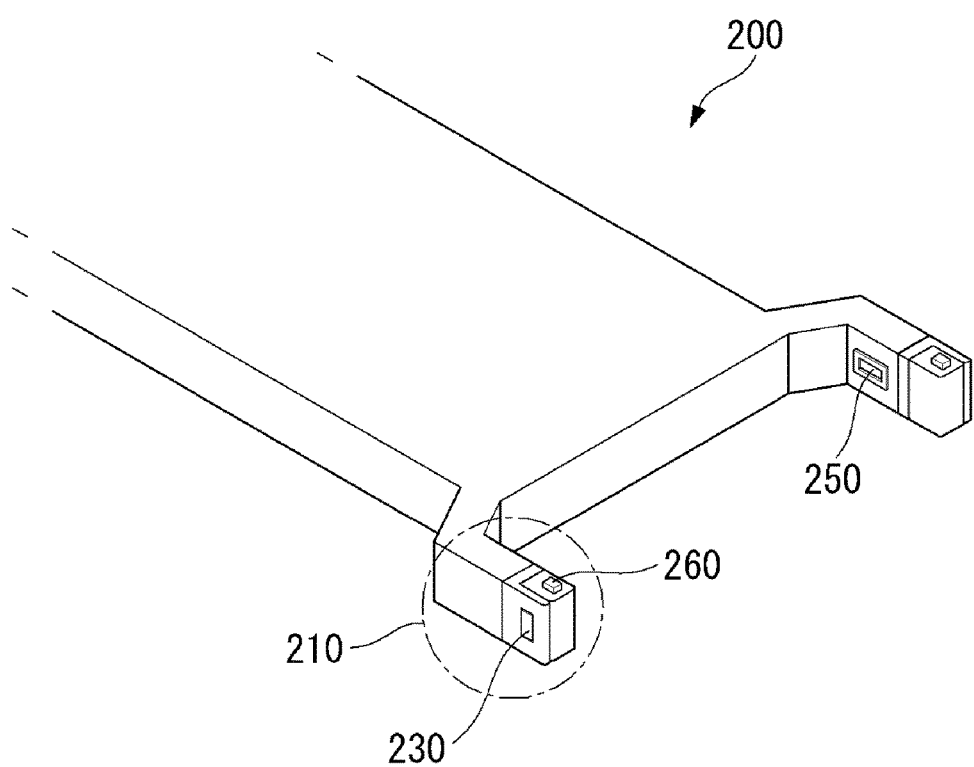
FIG. 7 is a view illustrating a coupling part of a band part of the electronic device of FIG. 5.

FIG. 6 is a perspective view of the main body 300 of the electronic device of FIG. 5, and FIG. 7 is a perspective view of the coupling part 210 of the band part 200 of the electronic device of FIG. 5.

Referring to FIG. 6, a display unit 151 may be provided on a front surface of the main body 300. The display unit 151 may output information provided by the controller 180, and may include a touch sensor to implement the touch screen. According to one example, the display portion 151 may have a circular shape.

A bezel 310 may surround the display unit 151. The bezel 310 may be provided to surround the display unit 151 to form a front surface of the electronic device 100 together with the display unit 151.

The bezel 310 may have a circular shape. Accordingly, the display unit 151 may be more design-specific than when the bezel 310 has a rectangular shape.

Lugs 320 may extend in opposite directions from both ends of the bezel 310. The lug 320 may be formed of the same or similar material as/to the bezel 310. The lug 320 may connect the bezel 310 and the band part 200.

An insertion groove 330 may be formed in the side region of the lug 320 to engage with the band part 200. The insertion groove 330 may have a locking groove 340 and a main body magnet 350 which fix the inserted band part 200.

The insertion groove 330 may be formed along the side surface portion of the lug 320, and the locking groove 340 may be formed at the end portion of the insertion groove 330. The locking groove 340 may be formed in at least one of upper and lower sides of the insertion groove 330. For example, at least one locking groove 340 may be formed at both ends of each lug 320, respectively. In addition, the insertion groove 330 may be provided with the main body magnet 350 for fixing the band part 200 with a magnetic force in a region where the band part 200 contacts.

A contact region may be formed at at least one region of the insertion groove 330 to which the band part 200 is coupled, thereby electrically connecting the electronic components mounted in the main body 300 and the electronic part provided in the band part 200. The contact region may be provided in a form of a conductive region that is electrically connected to the circuit unit 184 inside the main body 101 at the inside of the locking groove 340 or in the vicinity of the magnet 350.

Referring to FIG. 7, the band part 200 may include a coupling part 210 having a shape corresponding to the insertion groove 330 formed in the lug 320 of the main body 300.

The coupling part 210 may extend from one end of the band part 200, and may be formed into a shape corresponding to the insertion groove 330. The coupling part 210 may have a shape in which both sides of the band part 200 are elongated, and may include a locking part 260 corresponding to the locking groove 340 of the main body 300 and a band part magnet 250 corresponding to the main body magnet 350 at both ends thereof.

The locking part 260 may be located on the upper side surface and/or the lower side surface of the coupling part 210. The locking part 260 may be a structure protruding from the upper side surface and/or the lower side surface of the coupling part 210. When the coupling part 210 is seated in the insertion groove 330, the locking part 260 may be fixed in the locking groove 340 of the main body 300. When the coupling part 260 is inserted into the locking groove 340, the band part 200 may be fixed to the main body 300. The band part 200 fixed to the main body 300 may be fixed at the corresponding location until a user's intended external force is applied.

The locking parts 260 formed at both ends of the coupling part 210 may move into the coupling part 210 by an external force, and may protrude from the coupling part 210 when the external force is removed. Thus, when the coupling part 210 is inserted into the insertion groove 330, the locking part 260 may move into the coupling part 210, and when located at the locking groove 340, may protrude to be fixed in the locking groove 340.

Also, the band part magnet 250 provided at the coupling part 210 is magnetically coupled to the main body magnet 350 to prevent the coupling part 210 from being separated from the insertion groove 330.

Figure 8:
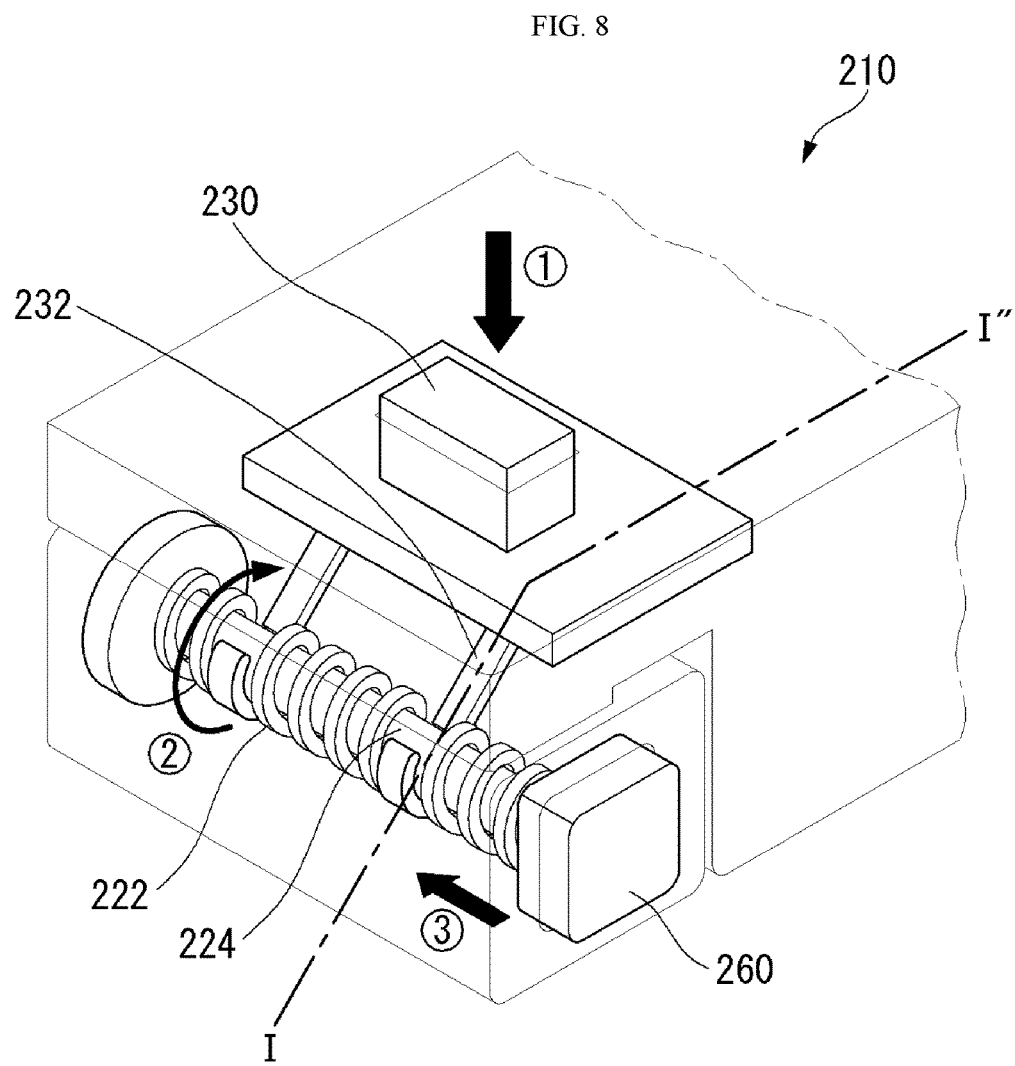
FIG. 8 is a view illustrating the inside of a coupling part of FIG. 6.
Figure 9:
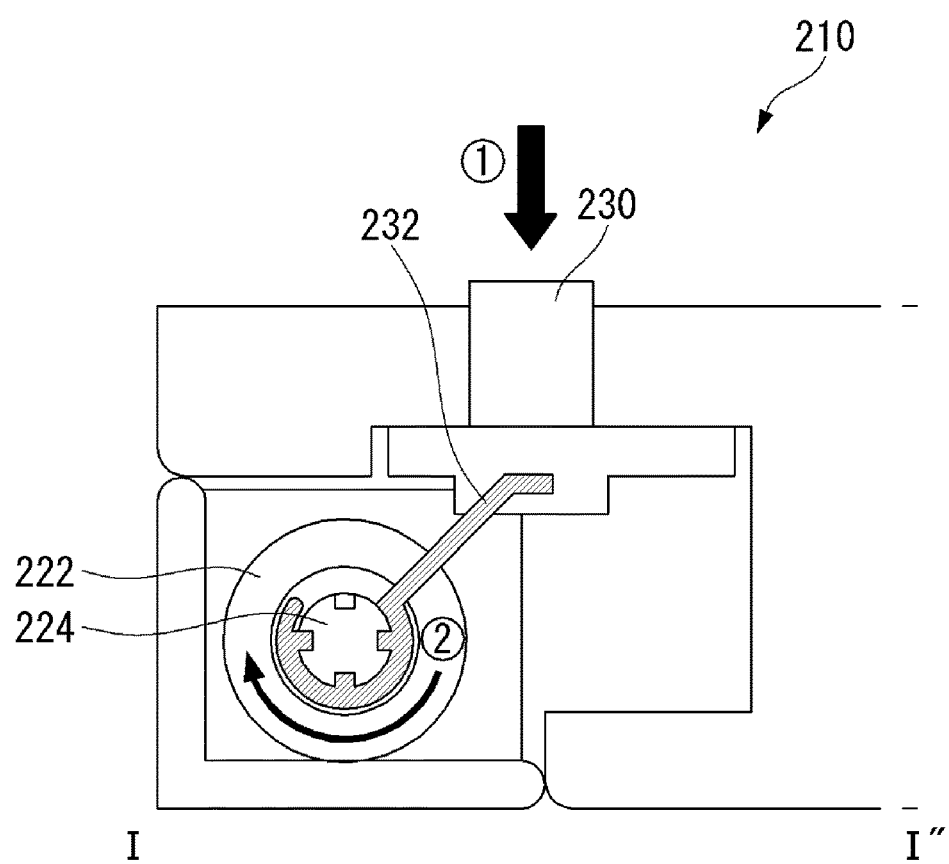
FIG. 9 is a view illustrating a cross-section of a coupling part of FIG. 6.

The coupling part 210 may include a button part 230 for delivering an external force to the locking part 260. Hereinafter, the operations of the button part 230 and the locking part 260 will be described with reference to FIGS. 8 and 9. FIG. 8 is a view illustrating the inside of a coupling part 210 of FIG. 6, and FIG. 9 is a view illustrating a cross-section of the coupling part 210 of FIG. 6.

The coupling part 210 may include a key connecting hinge part 232 delivering an external force of the button part 230, a hinge spring part 224 that receives a rotational force from the key connecting hinge part 232 and rotates, and an locking part 260 that moves in the rotational axis direction along the spiral of the spring 222 when the hinge spring part 224 rotates.

The hinge spring part 224 may have a shape in which a spring 222 is disposed on the outer circumferential surface of the rotational axis about the rotational axis. The hinge spring part 224 and the key connection hinge part 232 may be engaged with each other, and thus the hinge spring part 224 may be rotated by a force applied from the key connection hinge part 232.

When the button part 230 is pressed (1), a rotational force may be transmitted to the key connection hinge part 232. Consequently, the hinge spring part 224 may rotates (2), and the locking part 260 may move into the coupling part 210 (3). Thereafter, when the force applied to the button part 230 is released, a rotational force in the opposite direction may be transmitted to the key connection hinge part 232, allowing the hinge spring part 224 to also rotate in the opposite direction and thus allowing the locking part 260 to outwardly protrude from the coupling part 210.

Thus, when the band part 200 fixed to the main body 300 is separated, the button part 230 may be pressed to separate the locking part 260 from the locking groove 340, thereby easily separating the band part 200.

Figure 10:
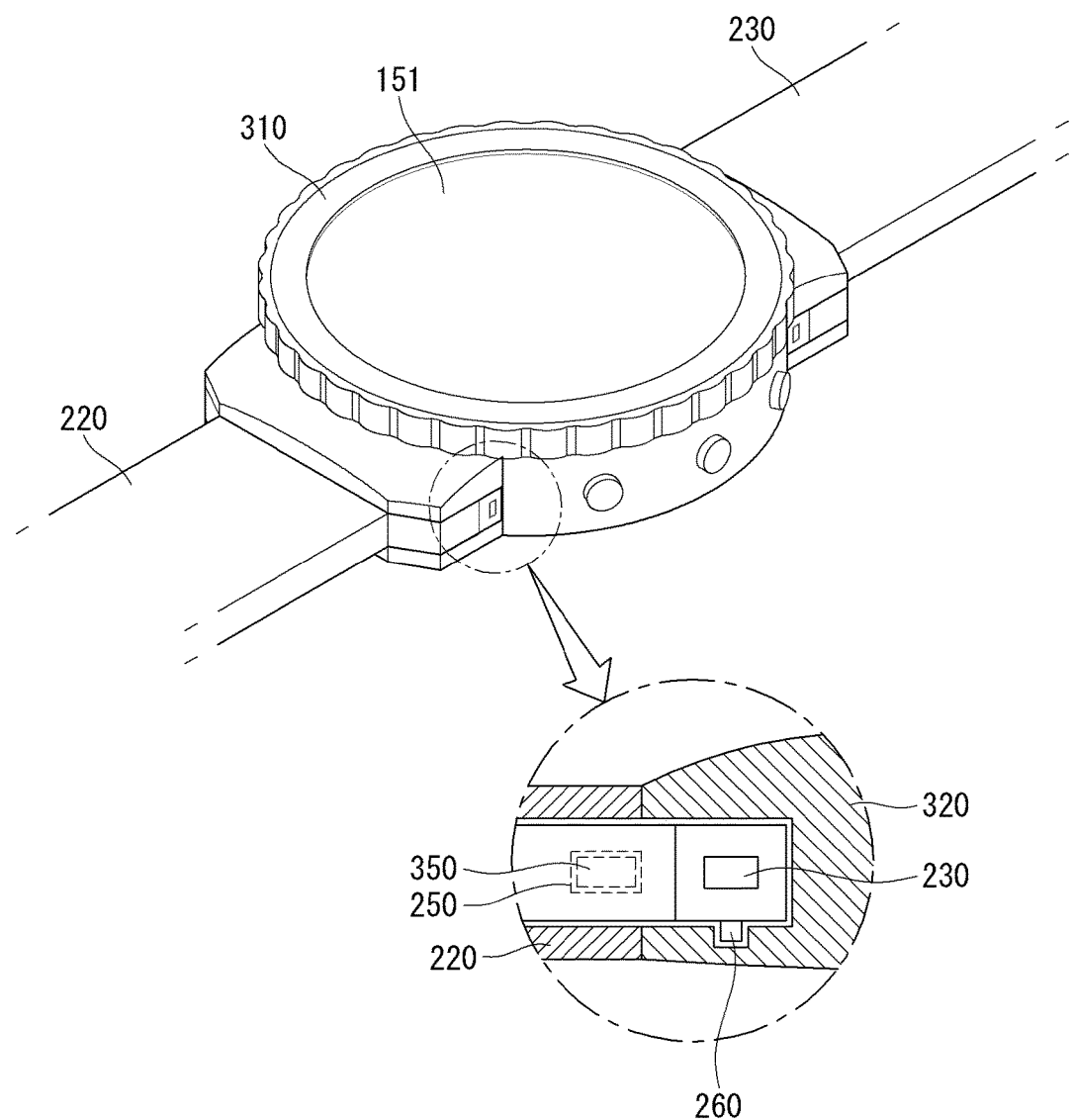
FIG. 10 is a view illustrating a coupling state of the coupling part of FIG. 6.

FIG. 10 is a view illustrating a coupling state of the coupling part 210 of FIG. 6.

An insertion groove 330 may be formed in the side region of the lug 320 to engage with the band part 200. The insertion groove 330 may have a locking groove 340 and a main body magnet 350 which fix the inserted band part 200.

The insertion groove 330 may be formed along the side surface portion of the lug 320, and the locking groove 340 may be formed at the end portion of the insertion groove 330. The locking groove 340 may be formed in at least one of upper and lower sides of the insertion groove 330.

The coupling part 210 formed at one end of the band part 200 may have a shape corresponding to the insertion groove 330. The coupling part 210 may include a locking part 260 inserted into the locking groove 340 and a band part magnet 250 corresponding to the main body magnet 350 at both ends thereof. The locking part 260 may be located on the upper side surface and/or the lower side surface of the coupling part 210. The locking part 260 may be a structure protruding from the upper side surface and/or the lower side surface of the coupling part 210. When the coupling part 210 is inserted into the insertion groove 330, the locking part 260 may be inserted into the locking groove 340, thereby fixing the band part 200 to the main body 300.

When the locking part 260 is inserted into the locking groove 340, the band part 200 may be fixed to the main body 300. The band part 200 fixed to the main body 300 may be fixed at the corresponding location until a user's intended external force is applied. The locking parts 260 formed at both ends of the coupling part 210 may move into the coupling part 210 by an external force, and may protrude from the coupling part 210 when the external force is removed. Thus, when the coupling part 210 is inserted into the insertion groove 330, the locking part 260 may move into the coupling part 210, and when located at the locking groove 340, may protrude to be fixed in the locking groove 340. Also, the band part magnet 250 provided a region where the insertion groove 330 and the coupling part 210 of the band part 200 contact each other may be magnetically coupled to the main body magnet 350 to prevent the coupling part 210 from being separated from the insertion groove 330.

The coupling part 210 may include a button part 230 for delivering an external force to the locking part 260. When the band part 200 fixed to the main body 300 is separated, the button part 230 may be pressed to separate the locking part 260 from the locking groove 340, thereby easily separating the band part 200.

Figure 11:
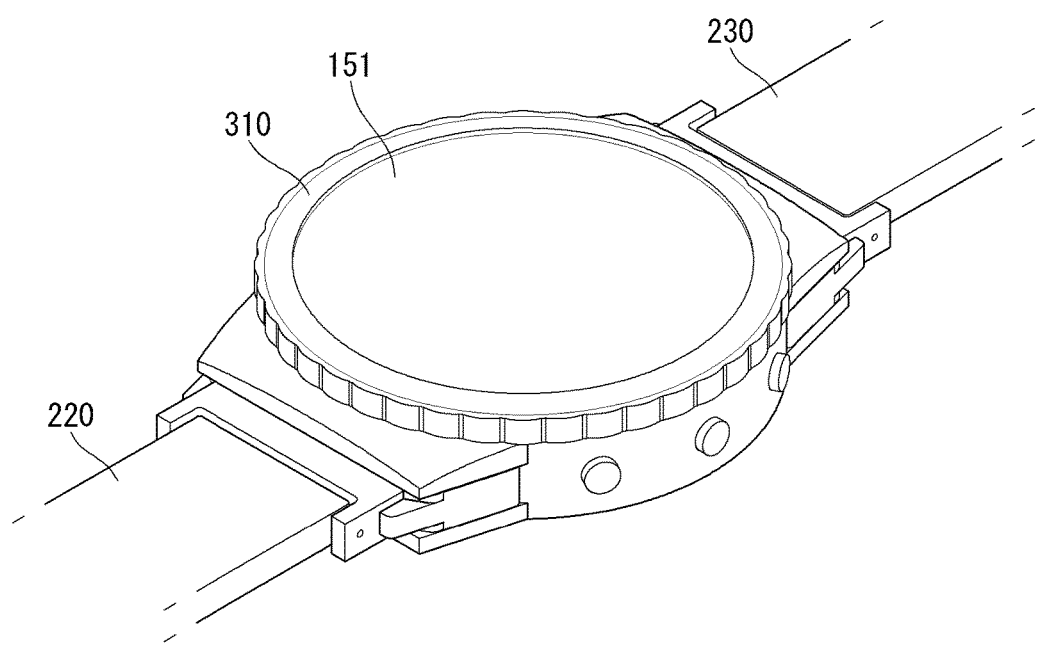
FIGS. 11 and 12 are perspective views illustrating another exterior of an electronic device according to an embodiment of the present invention.
Figure 12:
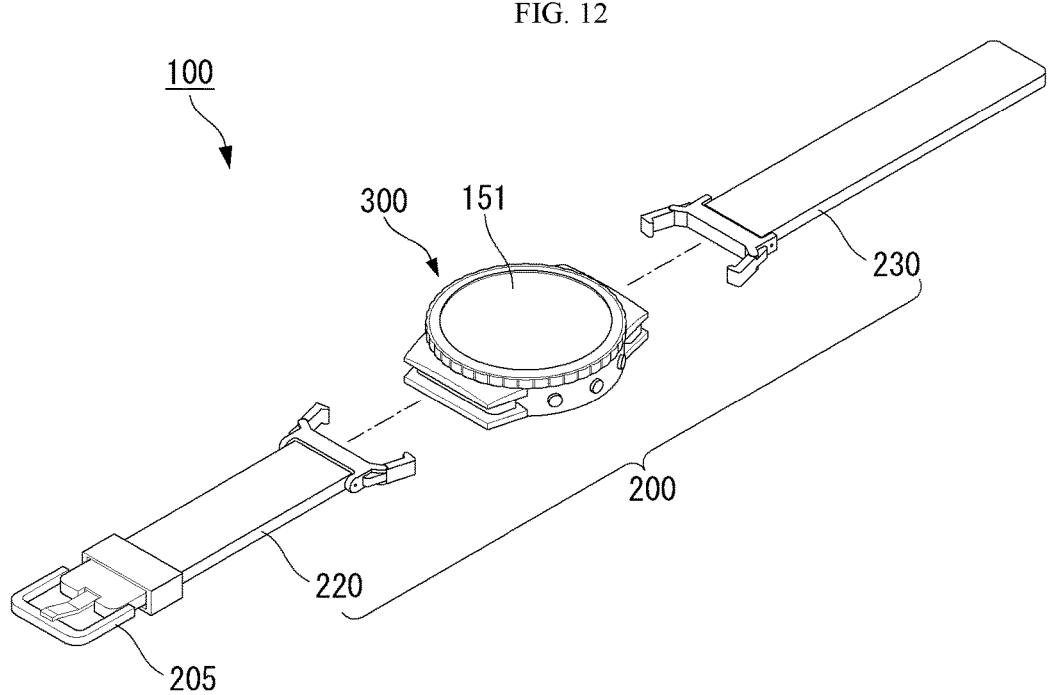

FIGS. 11 and 12 are perspective views illustrating another exterior of an electronic device according to an embodiment of the present invention.

Referring to FIGS. 11 and 12, an electronic device according to an embodiment of the present invention may include a main body 300 and a band part 200 detachably coupled to the main body 300.

The main body 300 may be a part including a display 151 of the electronic device 100. That is, the main body 300 may be a part that performs a function of displaying information on the display 151 by including a main board mounted with various electronic elements, performing communication, and processing information.

The main body 300 may be provided with various input units for operating the electronic device 100. For example, at least one user input button 123 may be provided on the front surface or side surface of the main body 300. The display 151 located on the front surface of the main body 300 may receive a user's touch operation.

The band part 200 may be a part that is coupled to the main body 300 and coupled to a user's wrist or the like. The main body 300 and the band part 200 may have a shape corresponding to the shape of the user's wrist. For example, the rear side of the main body 300 may be curved to correspond to the shape of the user's wrist, and the band part 200 may be formed into a user's wrist shape and/or may be formed of a naturally curved material. At the end of the band part 200, a buckle 205 capable of coupling the first and second band parts 220 and 230 may be provided.

The band part 200 may be detachably coupled to the main body 300. For example, each of the first and second band parts 220 and 230 may have a shape in which one side thereof may be coupled to or separated from the main body 300, or the first and second band parts 220 and 230 may be formed into a single band, allowing both ends of the single band to be coupled to or separated from the main body 300.

The band part 200 may be formed to have a curved surface when being formed of a rigid material, or may be formed of a flexible material. The band part 200 may be formed of a synthetic resin, a metal, a natural/artificial leather material, a material having a high elasticity, or a combination thereof, and may be configured to provide a waterproof function for the main body 300.

The band part 200 may be provided with an electronic part in which electronic parts may be mounted, and a band board 185, a sound output unit 152, a microphone 122, a light output unit 254 and an antenna (not shown) may be mounted in the electronic part.

At least one of coupling regions of the band part 200 and the body region 300 may be formed of a conductive material such that a circuit part disposed in the main body 200 and an electronic part disposed in the band part 200 are electrically connected to each other when the band part 200 and the main body 300 are connected to each other.

Figure 13:
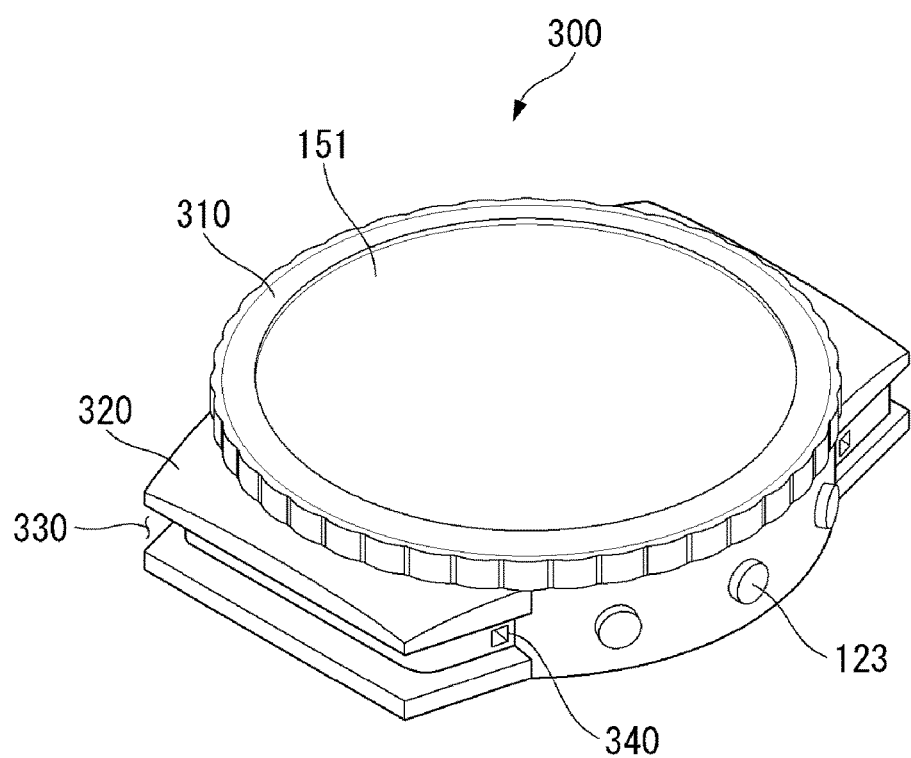
FIG. 13 is a view illustrating a main body of the electronic device of FIG. 11.

FIG. 13 is a perspective view illustrating a main body 300 of the electronic device of FIG. 11.

Referring to FIG. 13, a display unit 151 may be provided on a front surface of the main body 300. The display unit 151 may output information provided by the controller 180, and may include a touch sensor to implement the touch screen. According to one example, the display portion 151 may have a circular shape.

A bezel 310 may surround the display unit 151. The bezel 310 may be provided to surround the display unit 151 to form a front surface of the electronic device 100 together with the display unit 151.

The bezel 310 may have a circular shape. Accordingly, the display unit 151 may be more design-specific than when the bezel 310 has a rectangular shape.

Lugs 320 may extend in opposite directions from both ends of the bezel 310. The lug 320 may be formed of the same or similar material as/to the bezel 310. The lug 320 may connect the bezel 310 and the band part 200.

An insertion groove 330 may be formed in the side region of the lug 320 to engage with the band part 200. The insertion groove 330 may have a locking groove 340 which fixes the inserted band part 200.

The insertion groove 330 may be formed along the side surface portion of the lug 320, and the locking groove 340 may be formed at the end portion of the insertion groove 330. The locking groove 340 may be formed in pair in both side surfaces of the lug 320. Here, a magnet for fixing the band part 200 with a magnetic force may be formed in the insertion groove 330.

A contact region may be formed at at least one region of the insertion groove 330 to which the band part 200 is coupled, thereby electrically connecting the electronic components mounted in the main body 300 and the electronic part provided in the band part 200. The contact region may be provided in a form of a conductive region that is electrically connected to the circuit unit inside the main body 300 at the inside of the locking groove 340 or in the vicinity of the magnet 350.

Figure 14:
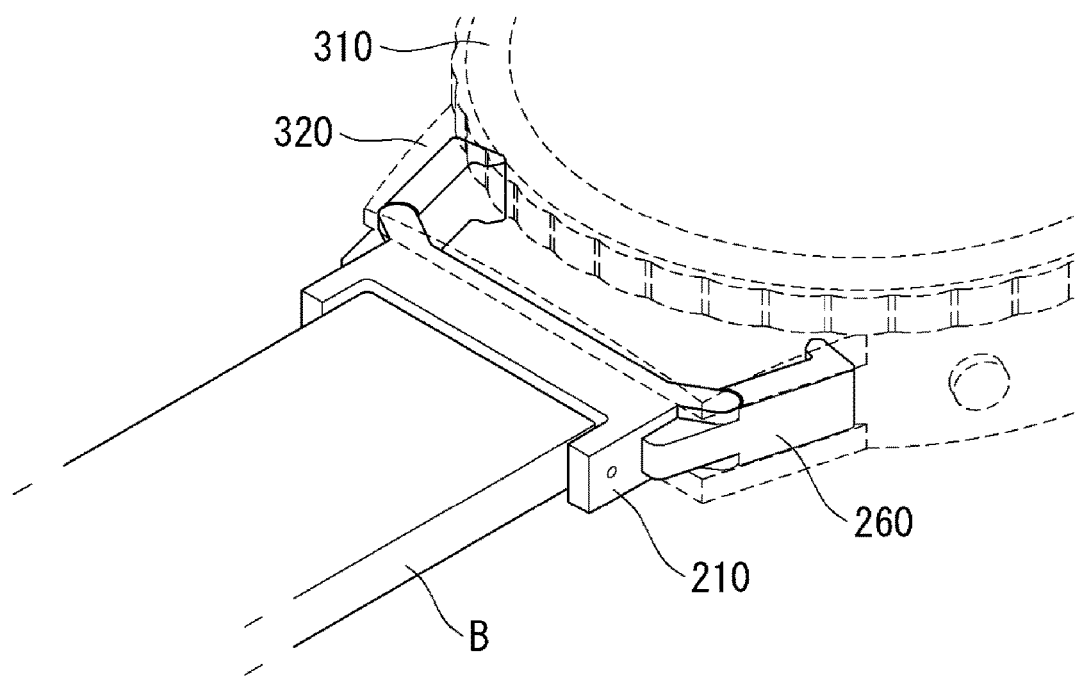
FIGS. 14 to 16 are views illustrating a coupling state of the band part of FIG. 11.
Figure 15:
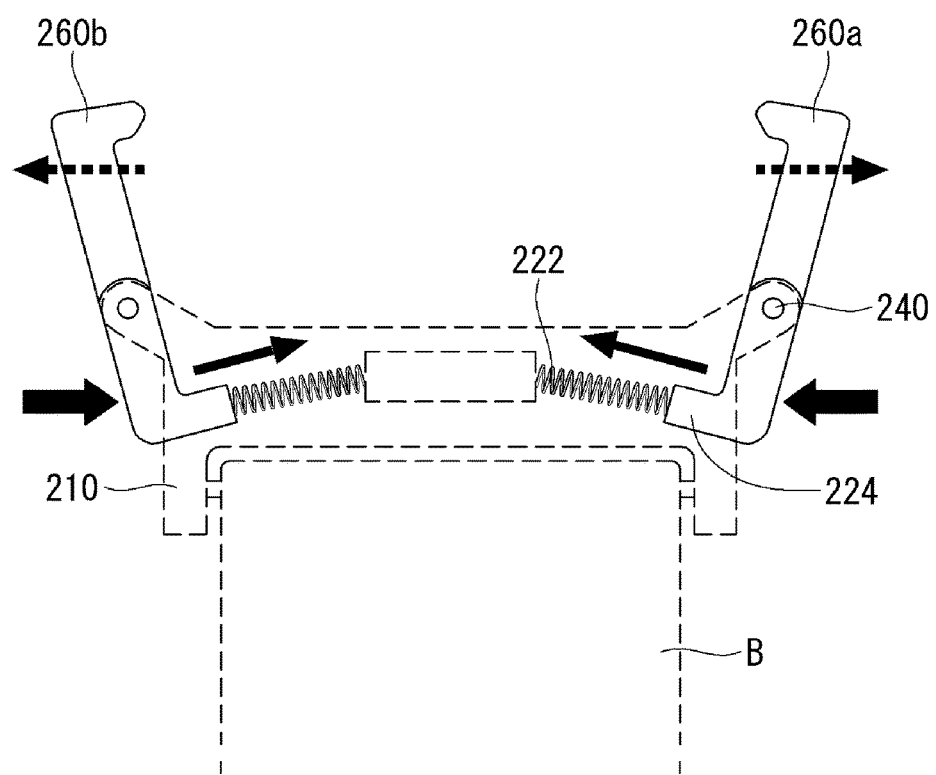
Figure 16:
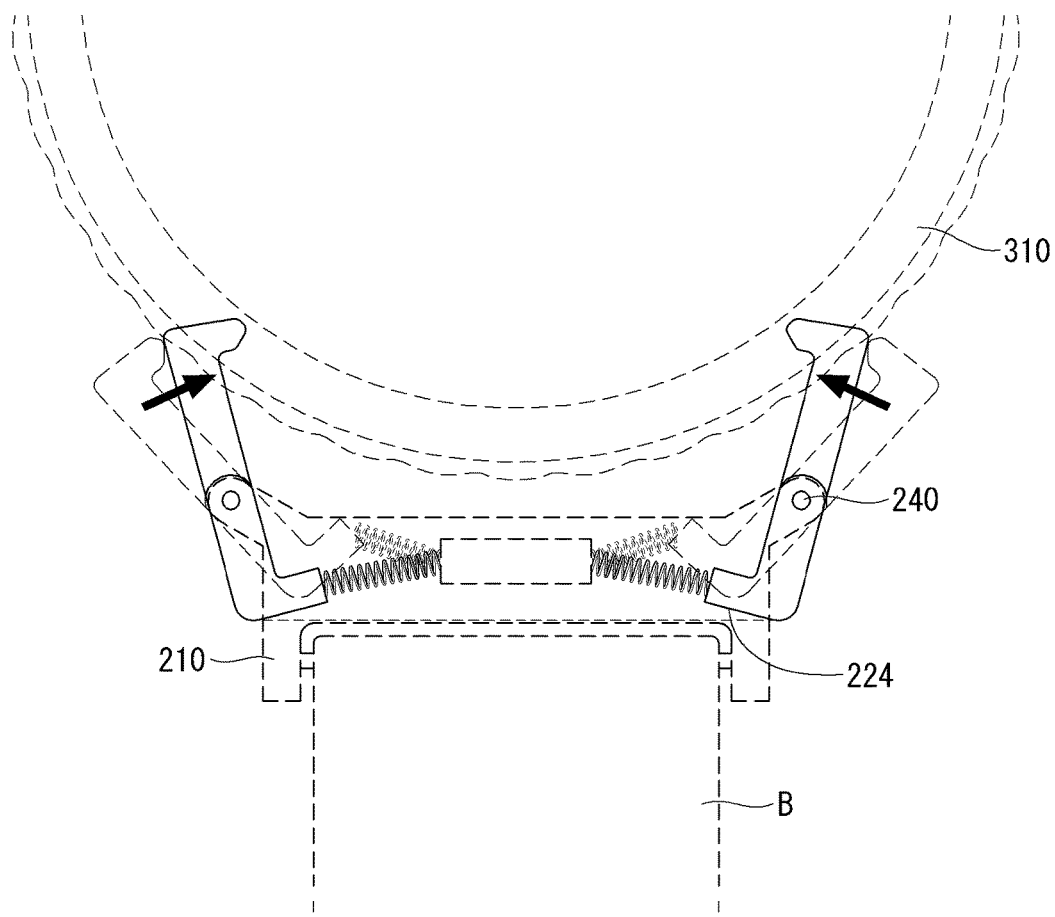

FIGS. 14 to 16 are views illustrating a coupling state of the band part 200. FIG. 14 shows the coupling state of the main body 300 and the band part 200. FIG. 15 shows the operation state of the locking part 260 of the band part 200. FIG. 16 shows the operation of the locking part 260 when the main body 300 and the band part 200 are coupled.

Referring to FIG. 14, the band part 200 may include a coupling part 210 coupled to the insertion groove 330 of the main body 300 to connect the band B to the main body 300.

The coupling part 210 may be provided with a pair of locking parts 260 allowing the band B to be coupled thereto and coupled to the locking grooves 340 formed on both side surfaces of the main body 300.

The band B may be detachably coupled to the coupling part 210, and may be replaced according to the user's selection.

The locking part 260 may be formed to engage with both side surfaces of the lug 320 extending from both ends of the coupling part 210 and extending from the bezel 310. The ends of the pair of locking parts 260a and 260b may be inwardly bent to engage with the locking groove 340.

Referring to FIG. 15, a pair of locking parts 260a and 260b may be coupled to both ends of the coupling part 210 by the hinge pin 240. When an external force is applied, the pair of locking parts 260a and 260b may outwardly rotate about the hinge pin 240 as a pivot axis. When the external force is removed, the locking parts 260a and 260b inwardly move, allowing the locking part 260 to be fixed into the locking groove 340.

A pressing portion 224 transmitting an external force applied to the locking part 260 and a spring portion 222 contracted by the pressing portion 224 may be provided in the coupling part 210. When the external force is removed, the spring portion 222 may transmit an elastic force to the pressing portion 224 to move the locking parts 260a and 260b to the original locations.

As shown in FIG. 16, when an external force is applied, the pair of locking parts 260a and 260b may outwardly rotate about the hinge pin 240, such that the pair of locking parts 260a and 260b may be engaged with the bezel 310. In this case, the pressing portion 224 in the coupling part 210 may transmit an external force to the spring portion 222.

When the external force is removed, the spring portion 222 may transmit an elastic force to the pressing portion 224 to move the locking parts 260a and 260b to the original locations. Thus, the locking parts 260a and 260b may be moved inward such that the locking part 260 can be fixed in the locking groove 340.

FIGS. 17 to 21 are views illustrating a coupling part of a band part of an electronic device according to another embodiment of the present invention.

According to another embodiment of the present invention, a coupling part 210 may be provided with a pair of locking parts 260a and 260b for engaging with the locking groove 340 formed at the end portion of the main body 300.

Figure 17:
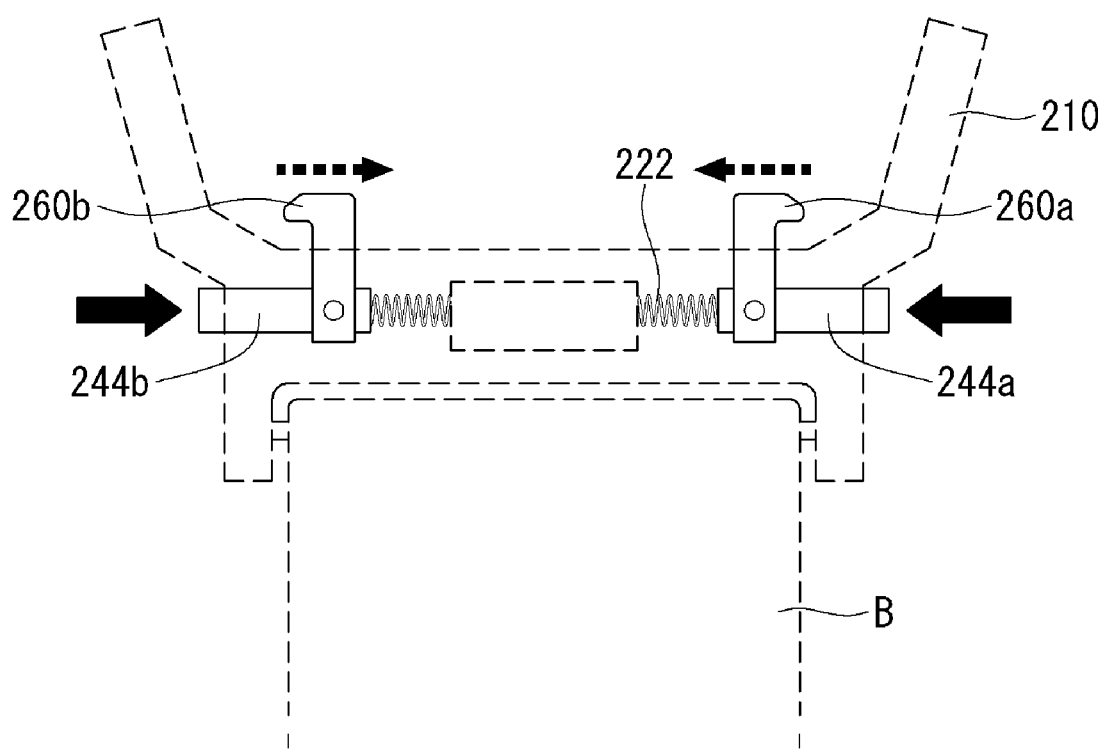
FIGS. 17 to 20 are views illustrating a coupling part of a band part of an electronic device according to another embodiment of the present invention.
Figure 18:
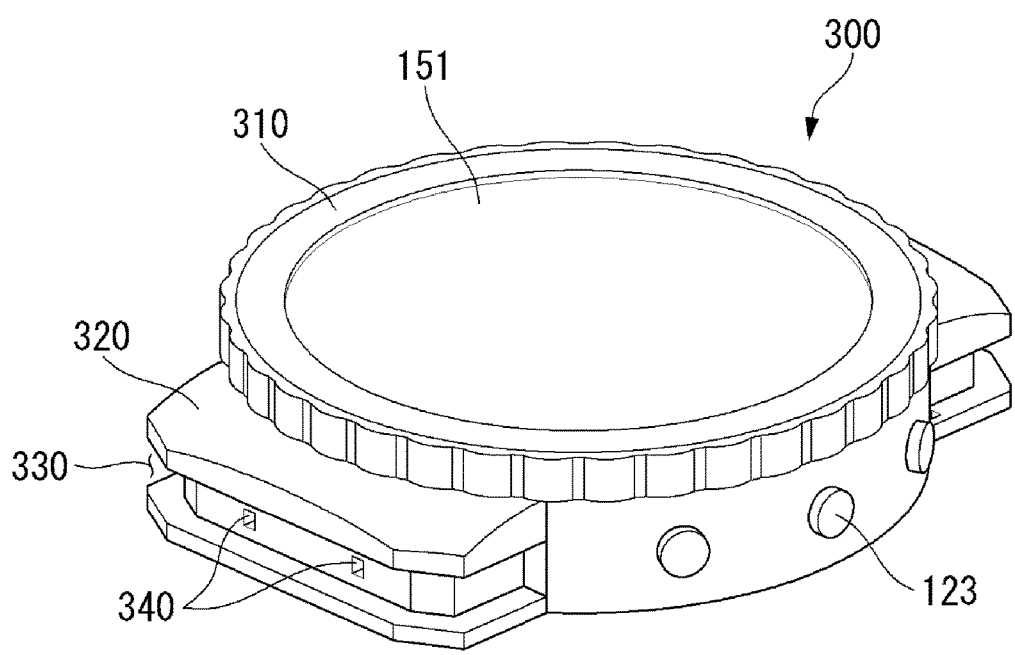

Referring to FIG. 17, the band part 200 may include a coupling part 210 coupled to the insertion groove 330 formed at the end portion of the main body 300 and connecting a band B to the main body 300.

The coupling part 210 may be provided with a pair of locking parts 260a and 260b allowing the band B to be coupled thereto and coupled to the locking grooves 340 formed on the main body 300.

The band B may be detachably coupled to the coupling part 210, and may be replaced according to the user's selection.

The locking parts 260a and 260b may protrude from the end portion of the coupling part 210, and may engage with the locking groove 340 of the main body 300. The ends of the pair of locking parts 260a and 260b may be bent to engage with the locking groove 340.

Figure 19:
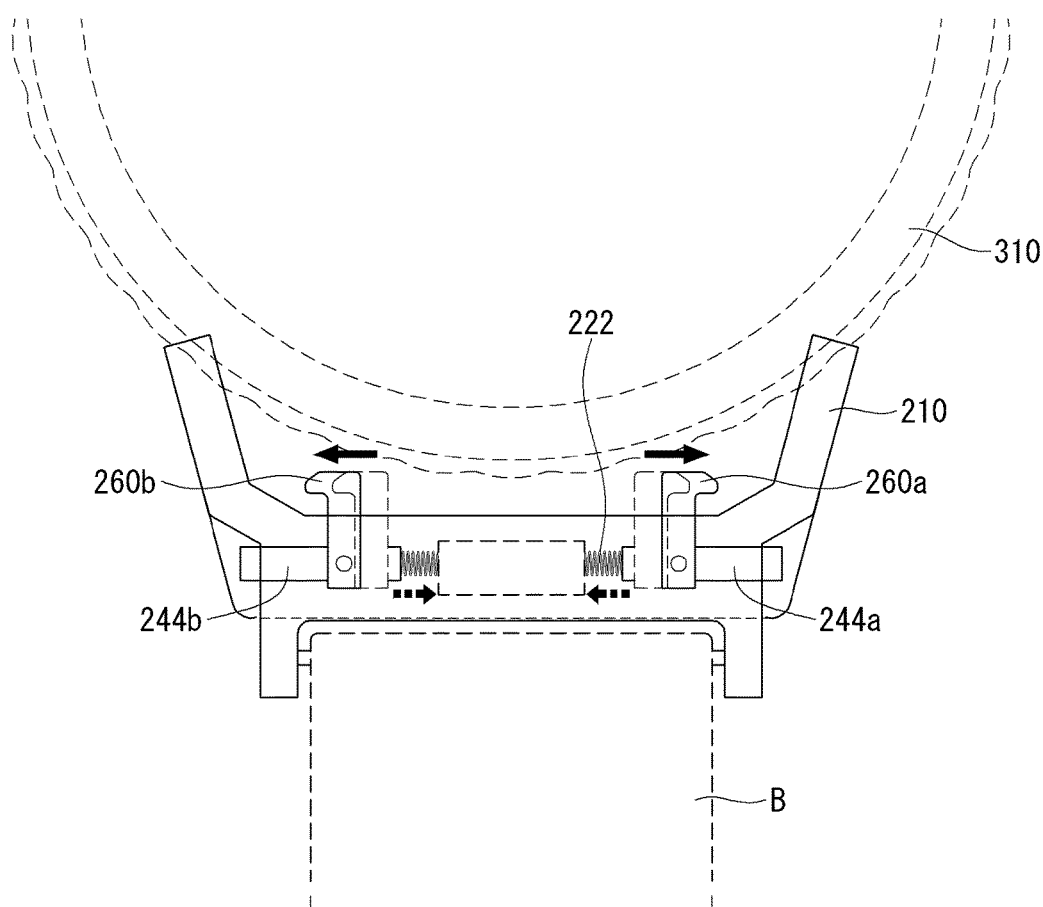

Referring to FIG. 19, a display unit 151 may be provided on a front surface of the main body 300. The display unit 151 may output information provided by the controller 180, and may include a touch sensor to implement the touch screen. According to one example, the display portion 151 may have a circular shape.

A bezel 310 may surround the display unit 151. The bezel 310 may be provided to surround the display unit 151 to form a front surface of the electronic device 100 together with the display unit 151.

The bezel 310 may have a circular shape. Accordingly, the display unit 151 may be more design-specific than when the bezel 310 has a rectangular shape.

Lugs 320 may extend in opposite directions from both ends of the bezel 310. The lug 320 may be formed of the same or similar material as/to the bezel 310. The lug 320 may connect the bezel 310 and the band part 200.

An insertion groove 330 may be formed in the side region of the lug 320 to engage with the band part 200. The insertion groove 330 may have a locking groove 340 which fixes the inserted band part 200.

A pair of locking grooves 340 may be formed on the side surface portion of the lug 320 in which the insertion groove 330 is formed. At least one locking groove 340 may be formed, and a magnet for fixing the band part 200 by a magnetic force may be added to the insertion groove 330.

Here, a contact region may be formed at at least one region of the insertion groove 330 to which the band part 200 is coupled, thereby electrically connecting the electronic components mounted in the main body 300 and the electronic part provided in the band part 200. The contact region may be provided in a form of a conductive region that is electrically connected to the circuit unit inside the main body 300 at the inside of the locking groove 340 or in the vicinity of the magnet 350.

Figure 20:
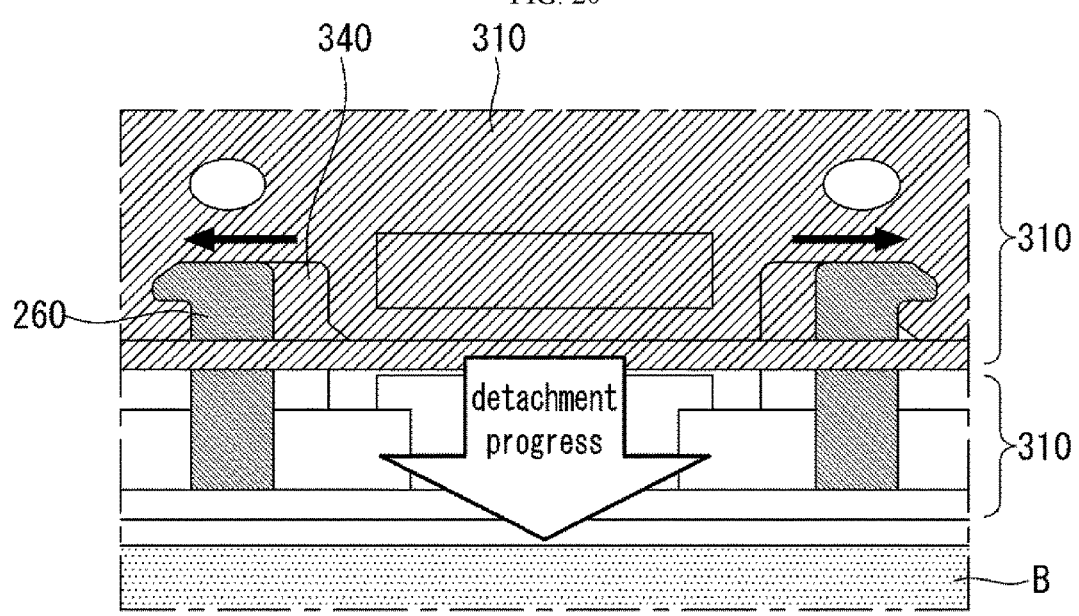

Referring to FIGS. 19 and 20, the pair of locking parts 260a and 260b may protrude from the end portion of the coupling part 210, and may move along the end portion of the coupling part 210 for engagement with the locking groove 340. When an external force is applied, the pair of locking parts 260a and 260b may inwardly move, and when the external force is removed, the locking parts 260a and 260b outwardly move, allowing the locking part 260 to be fixed into the locking groove 340.

Pressing portions 224a and 224b transmitting an external force applied to the locking part 260 and a spring portion 222 contracted by the pressing portions 224a and 224b may be provided in the coupling part 210. When the external force is removed, the spring portion 222 may transmit an elastic force to the pressing portions 224a and 224b to move the locking parts 260a and 260b to the original locations.

As shown in FIG. 20, when an external force is applied, the pair of locking parts 260a and 260b may move inward, and may become insertable into the locking groove 340 of the bezel 310. In this case, the pressing portion 224 in the coupling part 210 may transmit an external force to the spring portion 222.

When the external force is removed, the spring portion 222 may transmit an elastic force to the pressing portion 224 to move the locking parts 260a and 260b to the original locations. Thus, the locking parts 260a and 260b may be moved outward such that the locking part 260 can be fixed in the locking groove 340.

When the locking parts 260a and 260b are coupled to the locking groove 340, the band part 200 may be fixed to the main body 300. The band part 200 fixed to the main body 300 may be fixed at the corresponding location until a user's intended external force is applied.

Figure 21:
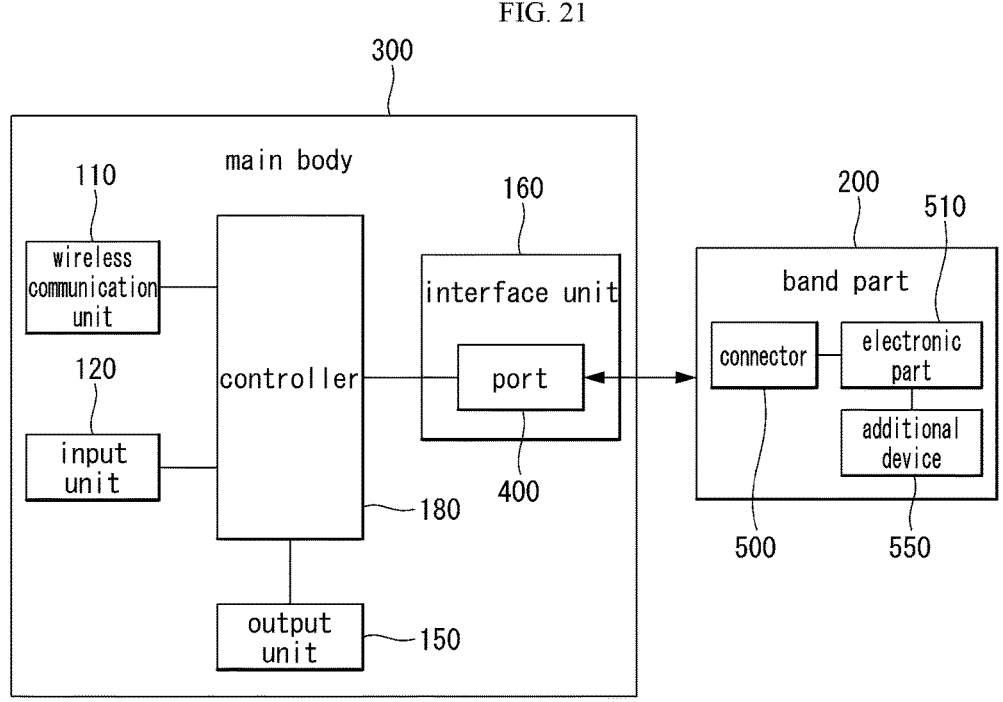
FIG. 21 is a view illustrating a coupling state of the coupling part of FIG. 20.

FIG. 21 is a block view illustrating an electronic device according to another embodiment of the present invention.

The electronic device 100 may include a main body 300 for providing a main function, and a band part 200 detachably connected to both ends of the main body 300 and electrically connected to electronic devices provided in the main body 300.

The main body 300 may include some or all of the components of FIG. 1. For example, the main body 300 may be a part that includes a main board for performing functions of a wireless communication unit 110, an input unit 120, an output unit 150, a controller 180, and an interface unit 160, thereby performing communication and processing information to display the processed information on the display 151.

A controller 180 provided in the main body 300 may control the overall operation of the electronic device 100. The controller 180 may process signals, data, and information which are inputted or outputted through the above-mentioned components, or may provide or process appropriate information or functions for a user by executing application programs stored in the memory 170.

The controller 180 may include an IC, and the representative IC may include an application processor (AP). The AP may perform the overall operation and control of a mobile terminal, and may include a plurality of ICs to control each component in addition to the APs. The IC may be mounted onto a board, and may receive/send signals through circuits implemented on the board to control each component. The interface unit 160 included in the main body 300 may serve as a channel with various kinds of additional devices 550 connected to the electronic device 100. The interface unit 160 may include at least one port 400 of a wired/wireless headset port, an external charger port, a wired/wireless data port, a memory card port, a port connecting a device including an identification module, an audio I/O port, a video I/O port, and an earphone port.

The band part 200 may be provided with a connector 500 corresponding to the port 400, and may be electrically connected to the main body 300. The band unit 200 may include an additional device 550 for providing an additional function and an electronic part (memory or AP (application processor)) 510 in which information about the additional device 550 is stored. Thus, when the band part 200 is connected to the main body 300, information related to the additional device 550, for example, additional device identification information and application for driving of the additional device may be provided.

The additional device 550 may include a camera, an sound output unit, a microphone, an light output unit, an antenna, an NFC, a flexible battery, and the like, as well as devices included in or added to the existing electronic device 100, and may include various devices for providing specialized functions such as a pace counter, a cardiac sensor, and a biosensor. When information related to the additional device 550 is received from the band part 200, the controller 180 of the main body 300 may switch the operation to a mode for using the corresponding additional device 550. When the band part 200 including the biosensor is connected, the operation mode may be switched to sports mode such as running mode or walking mode, health examination mode, biorhythm information providing mode, and diet mode.

Figure 22:
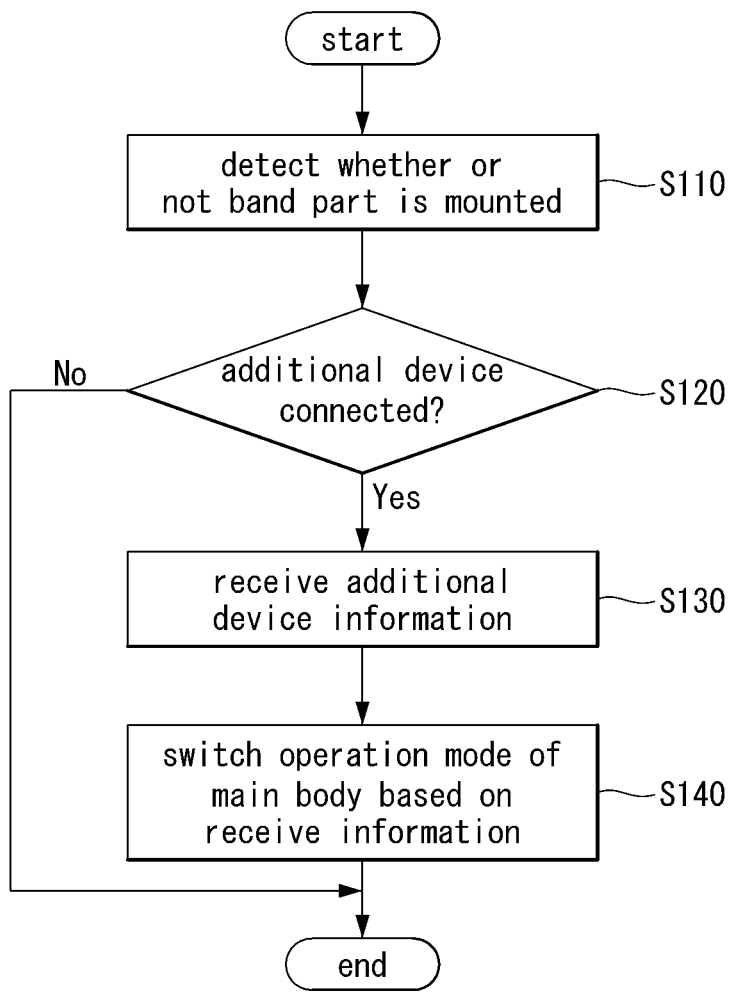
FIG. 22 is a view illustrating a coupling part of a band part according to another embodiment of the present invention.

FIG. 22 is a flowchart illustrating a control process of an electronic device according to another embodiment of the present invention.

The controller 180 of the main body 300 may detect whether the band part 200 is mounted or not (S110). When the connector 500 of the band part 200 is connected to the port 400 of the main body 300, the controller 180 may determine whether or not the band part 200 is mounted. It may also be possible to determine whether the band part 200 is mounted through the conductive region formed inside the locking groove 340 to which the band part 200 is coupled or in the vicinity of the magnet 350, or it may also be possible to determine using a separate sensing unit whether or not the band part 200 is mounted.

The controller 180 may check whether or not the additional device 550 of the band part 200 is connected to the band part 200 (S120), and may receive information related to the additional device 550 from the band part 200 when the connection is confirmed (S130). The band part 200 may provide an application for driving of additional devices and additional device identification information.

The controller 180 may change the operation mode according to the received information to perform appropriate control related to the additional device 550 (S140). The controller 180 may provide an appropriate operation mode for the corresponding device by driving an application stored in the memory 170 when only the identification information of the additional device 550 is received. The controller 180 may drive an application received from the band part 200 to provide an appropriate operation mode for the corresponding device.

Figure 23:
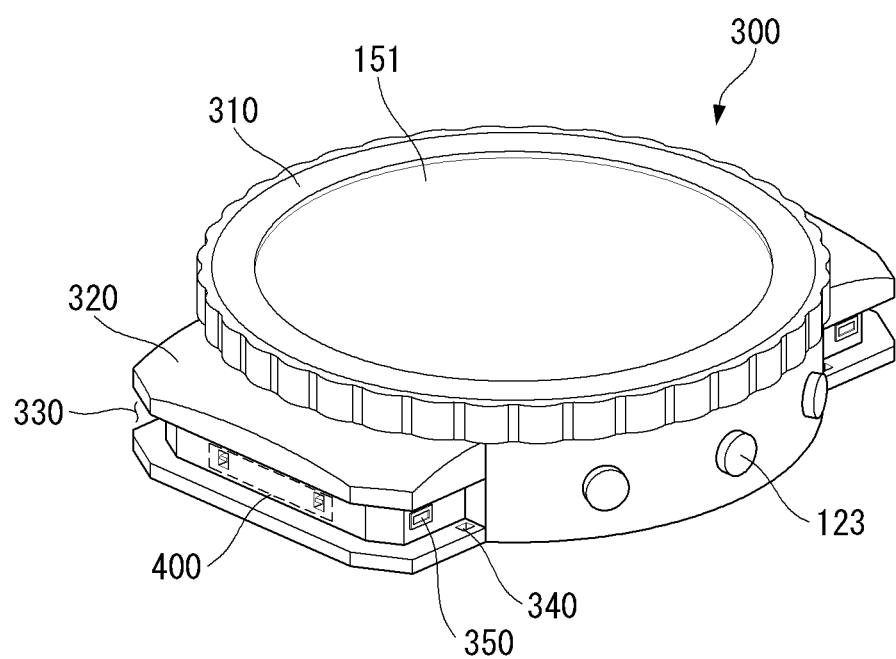
FIGS. 23 to 28 are views illustrating a use state of an electronic device according to an embodiment of the present invention.
Figure 24:
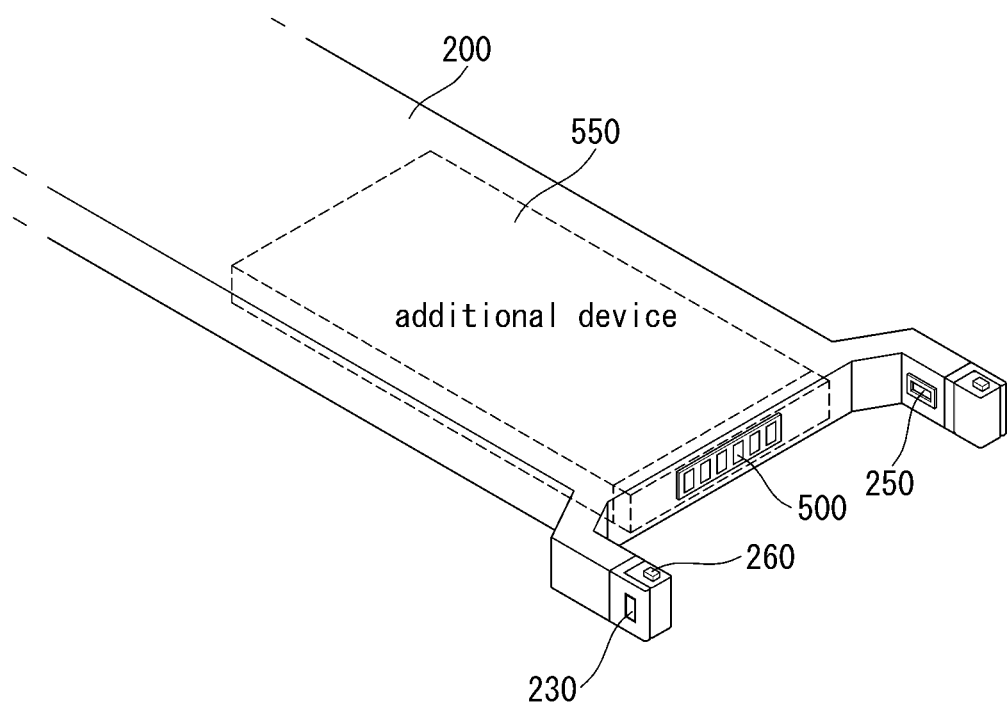
Figure 25:
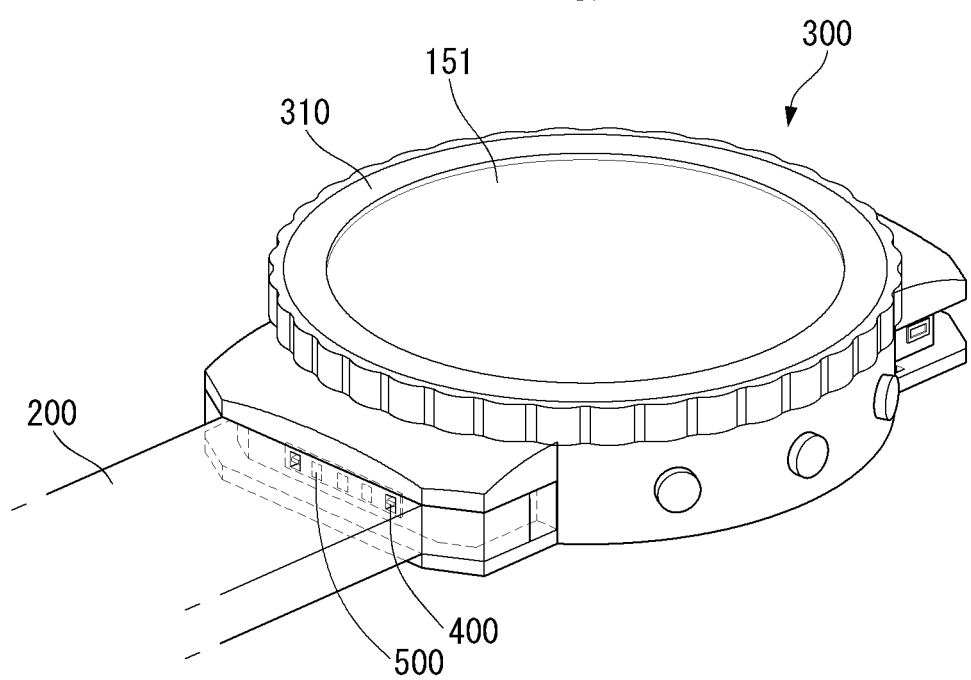

FIG. 23 is a perspective view of a main body 300 according to another embodiment of the present invention, and FIG. 24 is a view illustrating a coupling part 210 of a band part 200 according to another embodiment of the present invention. FIG. 25 is a view illustrating the engagement state of the coupling part 210 of FIG. 24.

Referring to FIG. 23, a port 400 for connection with the additional device 550 may be formed in the main body 300.

A display unit 151 may be provided on a front surface of the main body 300. The display unit 151 may output information provided by the controller 180, and may include a touch sensor to implement the touch screen. According to one example, the display portion 151 may have a circular shape.

A bezel 310 may surround the display unit 151. The bezel 310 may be provided to surround the display unit 151 to form a front surface of the electronic device 100 together with the display unit 151.

The bezel 310 may have a circular shape. Accordingly, the display unit 151 may be more design-specific than when the bezel 310 has a rectangular shape.

Lugs 320 may extend in opposite directions from both ends of the bezel 310. The lug 320 may be formed of the same or similar material as/to the bezel 310. The lug 320 may connect the bezel 310 and the band part 200.

An insertion groove 330 may be formed in the side region of the lug 320 to engage with the band part 200. The insertion groove 330 may have a locking groove 340 and a main body magnet 350 which fix the inserted band part 200.

The insertion groove 330 may be formed along the side surface portion of the lug 320, and the locking groove 340 may be formed at the end portion of the insertion groove 330. The locking groove 340 may be formed in at least one of upper and lower sides of the insertion groove 330. For example, at least one locking groove 340 may be formed at both ends of each lug 320, respectively. The main body magnet 350 corresponding to the band part magnet 250 provided in the band part 200 may be formed in a region where the insertion groove 330 and the band part 200 are in contact with each other, thereby fixing the band part 200 with a magnetic force.

In a central region of the insertion groove 330, a port 400 for connection of the additional device 550 may be formed. The port 400 may serve as a channel to the additional device 550. The interface unit 160 may include at least one port 400 of a wired/wireless headset port, an external charger port, a wired/wireless data port, a memory card port, a port connecting a device including an identification module, an audio I/O port, a video I/O port, and an earphone port.

Referring to FIGS. 24 and 25, the band part 200 may include an additional device 550 and an electronic part (memory or an application processor (AP)) storing information on the additional device 550, and may include a connector 500 making contact with the port 400 of the main body 300. In this drawing, the port 400 may be formed in a form of an engaging clip, and the connector 500 may be formed in a form of a contact terminal of a zebra pattern.

The coupling part 210 may extend from one end of the band part 200, and may be formed into a shape corresponding to the insertion groove 330. The coupling part 210 may have a shape in which both sides of the band part 200 are elongated, and may include a locking part 260 corresponding to the insertion groove 330 of the main body 300 and a band part magnet 250 corresponding to the main body magnet 350 at both ends thereof.

The locking part 260 may be located on the upper side surface and/or the lower side surface of the coupling part 210. The locking part 260 may be a structure protruding from the upper side surface and/or the lower side surface of the coupling part 210. The locking parts 260 formed at both ends of the coupling part 210 may move into the coupling part 210 when the button is pressed, and may protrude from the coupling part 210 when an external force is removed. Thus, when the locking part 260 of the band part 200 is fixed in the locking groove 340, the band part 200 may be coupled to the main body 300.

The connector 500 may be provided on the coupling part 210 of the band part 200. The connector 500 may be located at a position corresponding to the port of the main body 300. When the port 400 of the engaging clip form and the connector 500 of the contact terminal form make contact with each other through the coupling of the main body 300 and the band part 200, the controller 180 inside the main body 300 and the additional device 550 of the band part 200 may exchange signals with each other.

Thus, the electronic part provided in the band part 200 may provide information related to the additional device 550 for the main body 300, and the controller 180 of the main body 300 may switch the operation mode based on the received information.

Figure 26:
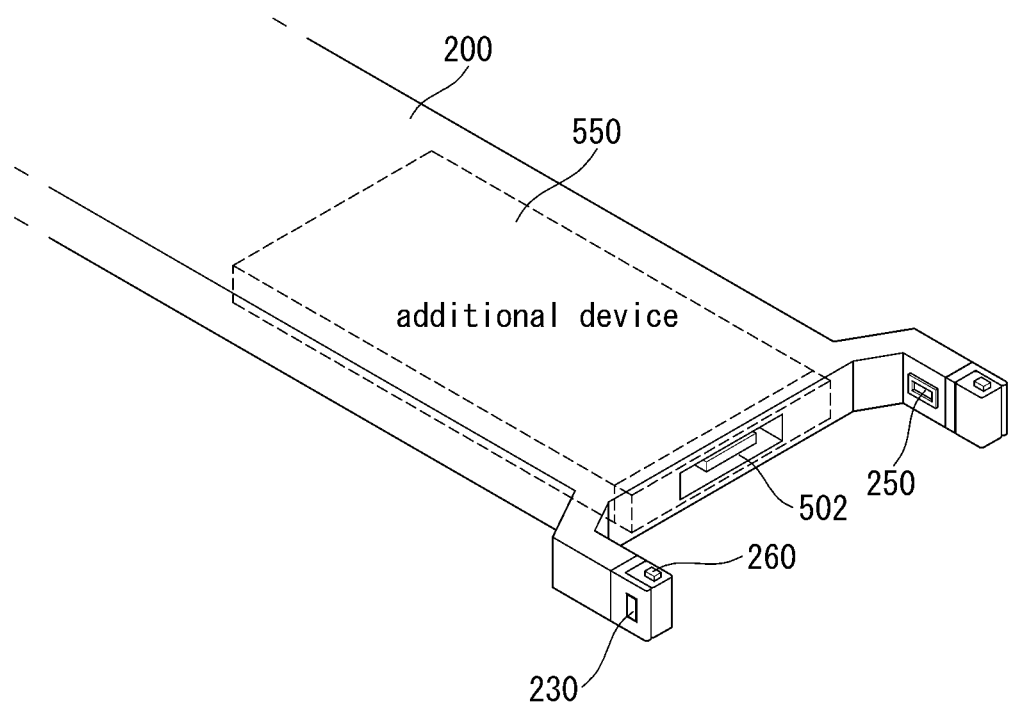

FIG. 26 is a view illustrating a coupling part 210 of a band part 200 according to another embodiment of the present invention. The band part 200 of FIG. 24 may be formed in the form of a contact terminal of a zebra pattern, whereas the band part 200 of FIG. 26 may be formed into a USB connector 502.

The band part 200 may include an additional device 550 and a USB connector 502 contacting the USB port 400 of the main body 300.

The USB connector 502 may be provided on the coupling part 210 of the band part 200. The USB connector 502 may be located at a position corresponding to the USB port 400 of the main body 300. When the USB connector 502 is connected to the port 400 of the main body 300 through the coupling of the main body 300 and the band 200, the controller 180 inside the main body 300 and the addition device 550 of the band part 200 may exchange signals with each other.

Thus, the electronic part provided in the band part 200 may provide information related to the additional device 550 for the main body 300, and the controller 180 of the main body 300 may switch the operation mode based on the received information. The coupling part 210 may extend from one end of the band part 200, and may have a shape corresponding to the insertion groove 330. The coupling part 210 may include a locking part 260 inserted into the locking groove 340 of the main body 300 and a band part magnet 250 coupled to the main body magnet 350 by a magnetic force at both ends thereof.

The locking part 260 may be located on the upper side surface and/or the lower side surface of the coupling part 210. The locking part 260 may be a structure protruding from the upper side surface and/or the lower side surface of the coupling part 210. The locking parts 260 formed at both ends of the coupling part 210 may move into the coupling part 210 when the button is pressed, and may protrude from the coupling part 210 when an external force is removed. Thus, when the locking part 260 of the band part 200 is fixed in the locking groove 340, the band part 200 may be coupled to the main body 300.

FIGS. 27 to 32 are views illustrating a use state of an electronic device according to an embodiment of the present invention.

Figure 27:
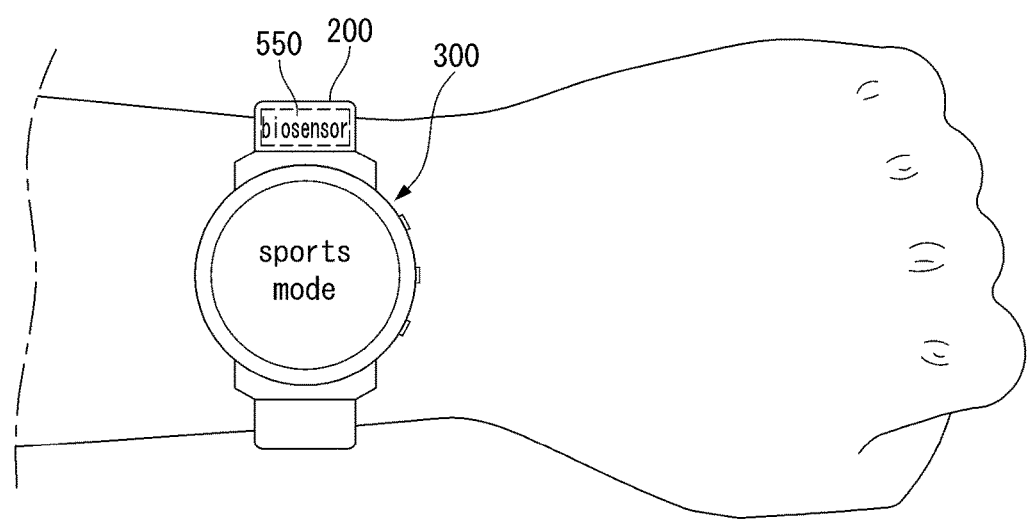

Referring to FIG. 27, the band part 200 may include a biosensor as the additional device 550. The biosensor may include a sensor that detects biometric information such as a user's heart rate, body temperature, and the like.

When the band part 200 having the biosensor is connected to the main body 300, the electronic part 510 of the band part 200 may provide information for communication with the biosensor and an application using the biosensor to the main body 300.

Examples of the application using the biosensor may include a sports-related application that provides a user's movement state, amount of movement, and a change in biosignal in accordance with movement, an application that provides health diagnosis information according to a user's biosignal, an application that provides biorhythm information, and an application that provides diet information.

The body unit 300 may be switch the operation mode to a sports mode such as a running mode and a walking mode, a health examination mode, a biorhythm information providing mode, and a diet mode, based on the biosensor-related information and the application which are received from the band part 200.

The controller 180 of the main body 300 may display the information of the operation mode switched according to the information received from the band part 200 on the display unit as "sports mode".

Figure 28:
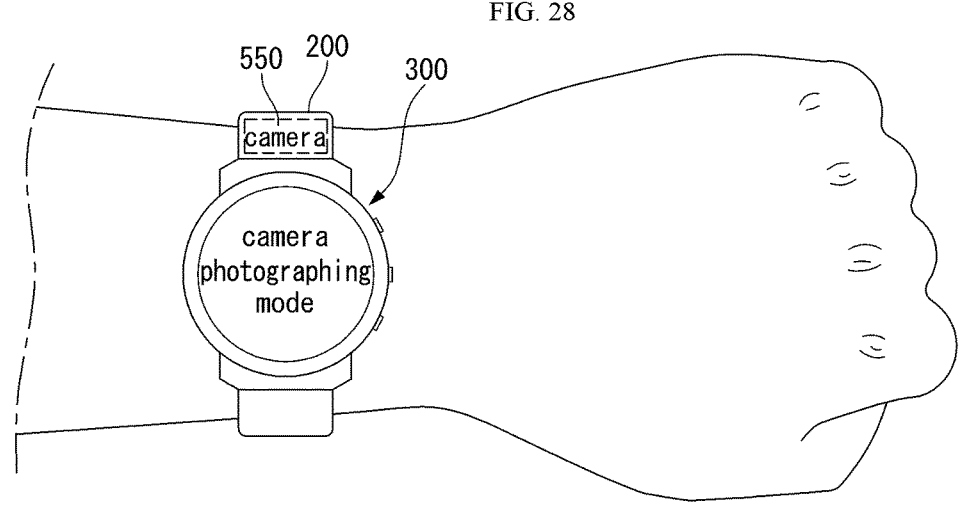

Referring to FIG. 28, the band part 200 may include a camera as the additional device 550.

When the band part 200 having the camera is connected to the main body 300, the electronic part 510 of the band part 200 may provide information for communication with the camera and an application for controlling the camera and the related functions. Here, when an application for camera control is already stored in the main body 300, the band part 200 may provide only information for identifying and controlling the camera.

The main body 300 may switch the operation mode to a camera photographing mode based on the camera-related information received from the band part 200. When the operation mode is switched according to the connection of the band part 200, the controller 180 of the main body 300 may display mode switching information on the display unit as "camera photographing mode".

Figure 29:
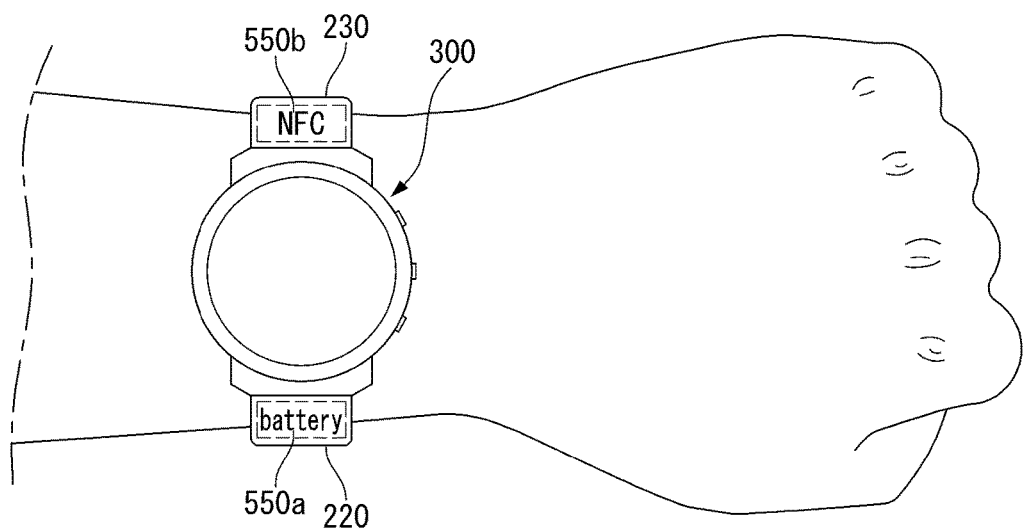
FIG. 29 is a perspective view illustrating another exterior of an electronic device according to an embodiment of the present invention.
Figure 30:
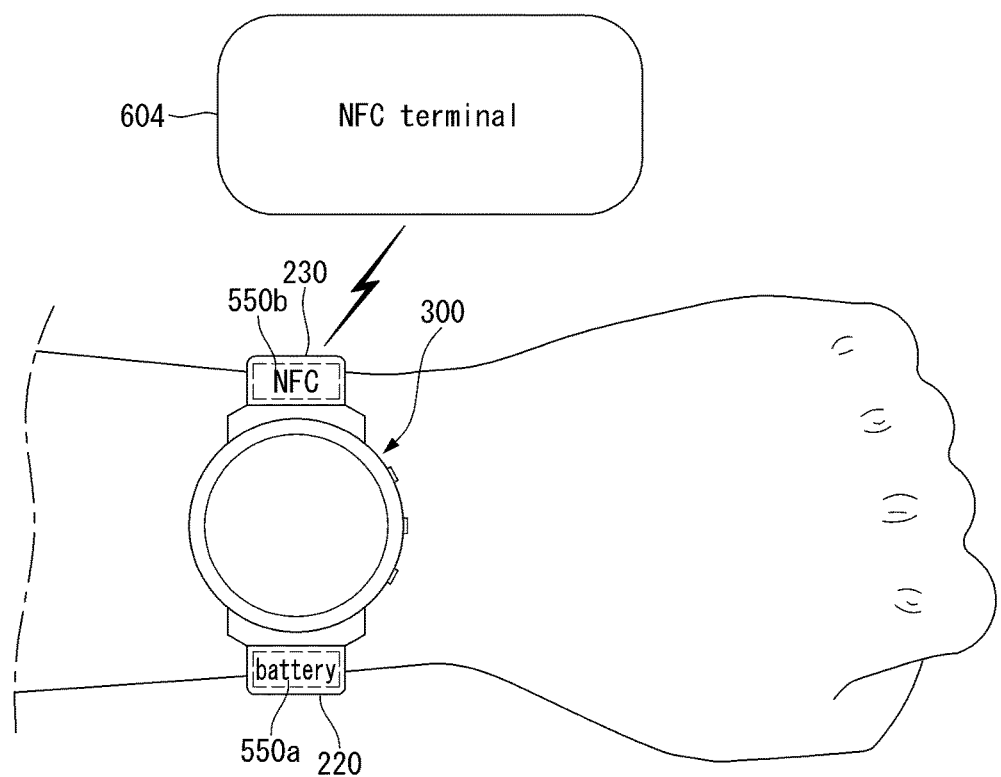
FIG. 30 is a perspective view of a main body of the electronic device of FIG. 29.

Referring to FIGS. 29 and 30, two or more additional devices 550 may be connected to the band part 200.

The band part 200 may include a first band part 220 and a second band part 230. The first and second band parts 220 and 230 may be coupled to one side of the main body 300 and the other side corresponding thereto, respectively. Thus, it may be possible to connect the two additional devices 550 by coupling the first band part 220 and the second band part 230, which include different additional devices 550, to the main body 300.

The first band part 220 and the second band part 230 may be coupled in opposite directions to both ends of the main body 300. Since a port 400 for connection of the additional device 550 can be formed in the coupling region of the band part 200, two or more ports 400 may be formed in the main body 300.

When the USB connector 502 is connected to the port 400 of the main body 300 through the coupling of the main body 300 and the band 200, the controller 180 inside the main body 300 and the addition device 550 of the band part 200 may exchange signals with each other. Accordingly, the controller 180 may identify the additional device 550, and may perform appropriate control.

Thus, the first band part 220 equipped with a battery 550a and the second band part 230 equipped with an NFC 550b may be connected to the main body 300 for use, respectively.

When the first band unit 220 equipped with the battery 550a and the second band unit 230 equipped with the NFC 550b are used in connection with each other, the NFC 550b may be used for communication with an external NFC terminal 604.

In order to smoothly communicate with the external NFC terminal 604, it may be desirable that the second band part 230 equipped with the NFC 550b is connected in an outward direction of the user's wrist.

Figure 31:
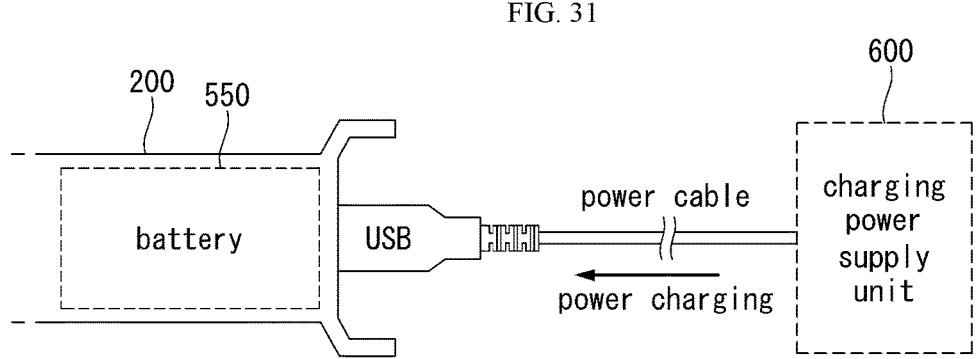
FIGS. 31 to 33 are views illustrating a coupling state of a main body and a band part of the electronic device shown in FIG. 29.

Referring to FIG. 31, the band part 200 may include a battery as the additional device 550, and may include a USB connector 502.

The band part 200 mounted with a battery may receive the charging power through a power cable connected to the USB connector 502.

The battery mounted in the band part 200 may be charged by connecting a USB power cable connected to a charging power supply unit 600 to the band part 200.

Figure 32:
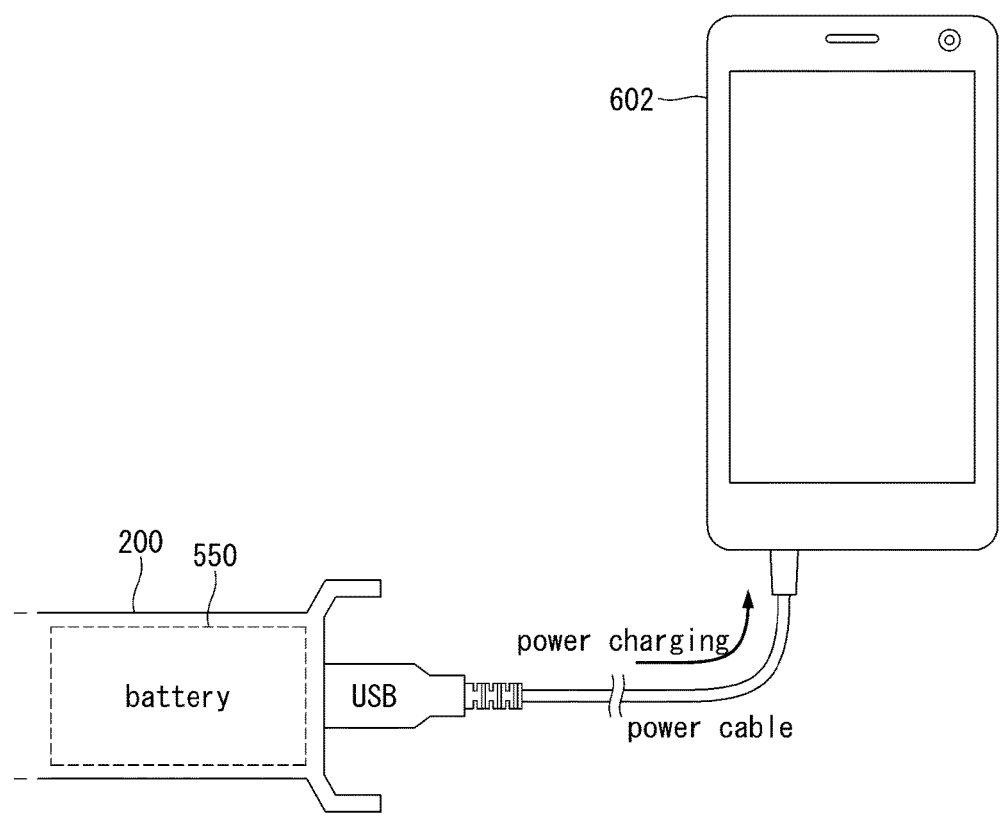

Referring to FIG. 32, the external terminal 602 may be charged using the battery mounted in the band part 200.

The battery mounted in the band part 200 may also be used for charging the external terminal 602. The band part 200 mounted with the battery may supply the charging power to the external terminal 602 through the power cable connected to the USB connector 502.

Figure 33:
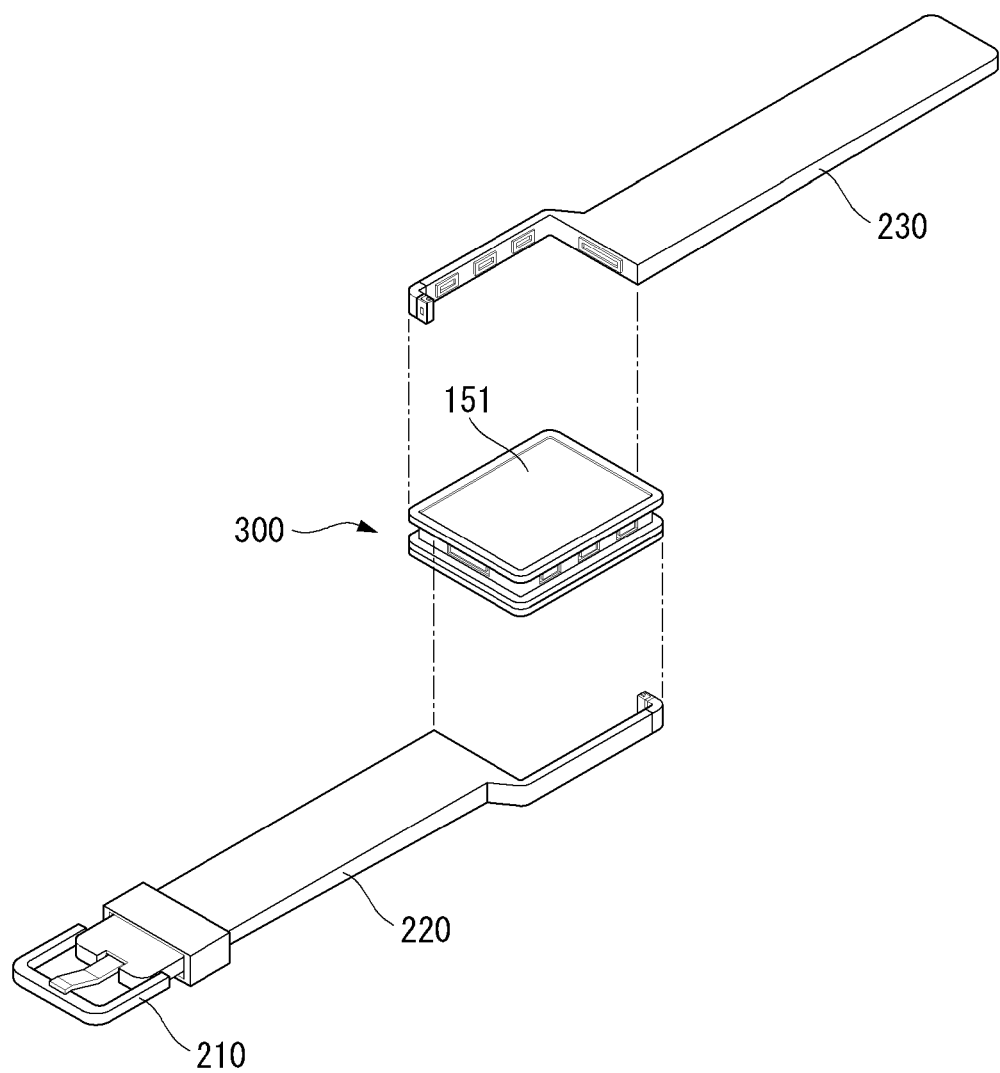

FIG. 33 is a perspective view illustrating another exterior of a watch-type electronic device according to an embodiment of the present invention, which illustrates a case where the main body 300 is formed in a rectangular shape.

Referring to FIG. 33, an electronic device according to an embodiment of the present invention may include a main body 300 and a band part 200 detachably coupled to the main body 300.

The main body 300 may be a part including a display 151 of the electronic device 100. That is, the main body 300 may be a part that performs a function of displaying information on the display 151 by including a main board mounted with various electronic elements, performing communication, and processing information.

The main body 300 may be provided with various input units for operating the electronic device 100. For example, the display 151 located on the front surface of the main body 300 may receive a user's touch operation.

The band part 200 may be a part that is coupled to the main body 300 and coupled to a user's wrist or the like. The main body 300 and the band part 200 may have a shape corresponding to the shape of the user's wrist. At the end of the band part 200, a buckle 205 capable of coupling the first and second band parts 220 and 230 may be provided.

The band part 200 may be detachably coupled to the main body 300. For example, each of the first and second band parts 220 and 230 may have a shape in which one side thereof may be coupled to or separated from the main body 300, or the first and second band parts 220 and 230 may be formed into a single band, allowing both ends of the single band to be coupled to or separated from the main body 300.

The band part 200 may be formed to have a curved surface when being formed of a rigid material, or may be formed of a flexible material. The band part 200 may be formed of a synthetic resin, a metal, a natural/artificial leather material, a material having a high elasticity, or a combination thereof, and may be configured to provide a waterproof function for the main body 300.

The band part 200 may be provided with an electronic part in which electronic parts may be mounted, and a band board 185, a sound output unit 152, a microphone 122, a light output unit 254 and an antenna (not shown) may be mounted in the electronic part.

At least one of coupling regions of the band part 200 and the body region 300 may be formed of a conductive material such that a circuit part disposed in the main body 200 and an electronic part disposed in the band part 200 are electrically connected to each other when the band part 200 and the main body 300 are connected to each other.

Figure 34:
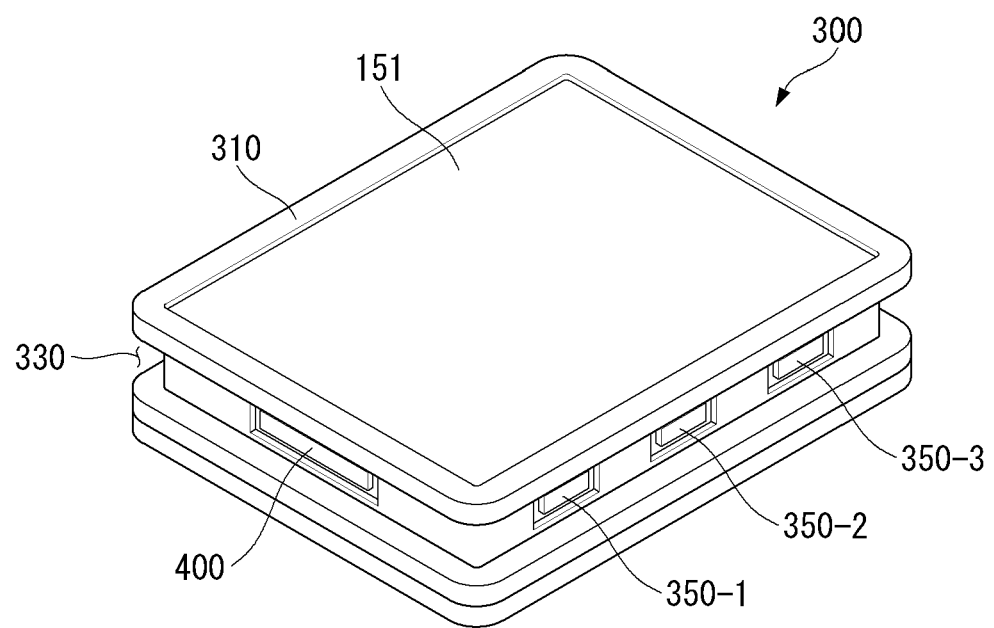
FIGS. 34 to 36 are views illustrating a use state of a watch-type electronic device according to another embodiment of the present invention.
Figure 35:
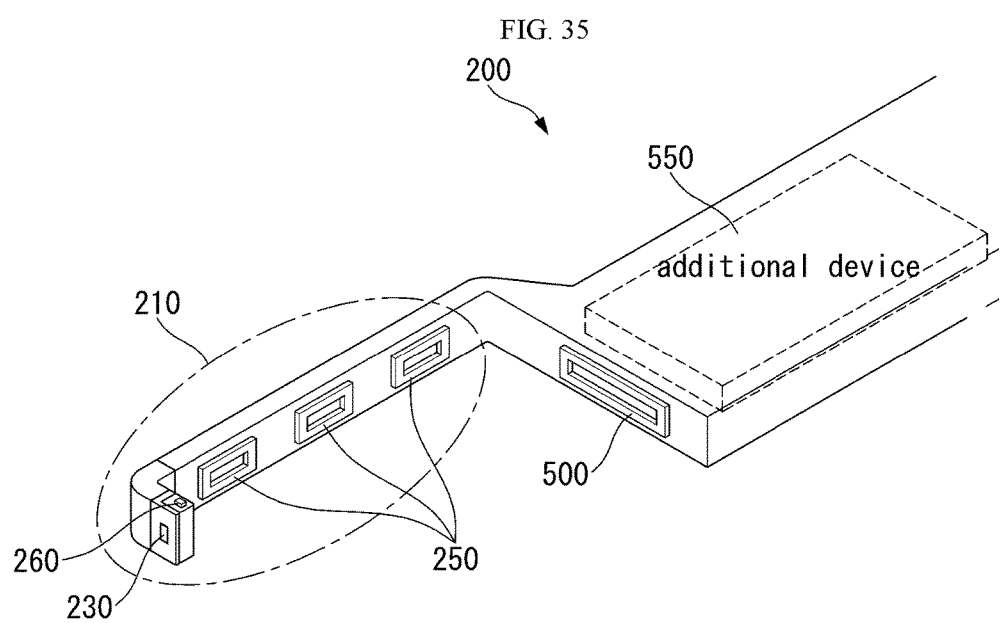

FIG. 34 is a perspective view of the main body 300 of the electronic device of FIG. 33, and FIG. 35 is a perspective view of the coupling part 210 of the band part 200 of the electronic device of FIG. 33.

Referring to FIG. 34, a display unit 151 may be provided on a front surface of the main body 300. The display unit 151 may output information provided by the controller 180, and may include a touch sensor to implement the touch screen. According to one example, the display portion 151 may have a rectangular shape.

A bezel 310 may surround the display unit 151. The bezel 310 may be provided to surround the display unit 151 to form a front surface of the electronic device 100 together with the display unit 151. The bezel 310 may have a rectangular shape.

An insertion groove 330 may be formed in the side region of the bezel 310 to engage with the band part 200. The insertion groove 330 may be formed over four sides of the bezel 310 having a rectangular shape.

The insertion groove 330 may have a locking groove 340 for fixing the inserted band part 200, and one or more main body magnets 350-1, 350-2, and 350-3. The locking groove 340 may be formed in at least one of upper and lower sides of the inside of the insertion groove 330.

A port 400 for connecting the additional device 550 mounted in the band part 200 may be formed in the insertion groove 330. The port 400 may serve as a channel to the additional device 550. The interface unit 160 may include at least one port 400 of a wired/wireless headset port, an external charger port, a wired/wireless data port, a memory card port, a port connecting a device including an identification module, an audio I/O port, a video I/O port, and an earphone port.

Here, when a separate port 400 is not formed in the main body 300, a contact region may be formed at at least one region of the insertion groove 330 to which the band part 200 is coupled, thereby electrically connecting the electronic components mounted in the main body 300 and the electronic part provided in the band part 200. The contact region may be provided in a form of a conductive region that is electrically connected to the circuit unit 184 inside the main body 101 at the inside of the locking groove 340 or in the vicinity of the magnet 350.

Referring to FIG. 35, the band part 200 may be located on one side of the main body 300 and on the other side corresponding thereto, respectively. The band part 200 may include a coupling part 210 extending along one side adjacent to a region contacting the main body 300 and having a shape surrounding a region where the band part 200 is coupled at the other side. That is, the first band part 220 and the second band part 230 may be formed to surround the side surfaces of the main body 300 having a rectangular shape. Thus, since the band part 200 can decorate the side surfaces of the main body 300 and can be detachably coupled to the main body 300 according to a user's selection, the color of the side surfaces of the main body 300 may be changed for the aesthetic effect through the band part 200.

The coupling part 210 may extend from one end of the band part 200, and may be formed into a shape corresponding to the insertion groove 330 of the bezel 310. The coupling part 210 may be formed in such a manner that one side region of the band part 200 is extended to cover at least one side of the bezel 310 having a rectangular shape.

The coupling part 210 may include a locking part 260 corresponding to the insertion groove 330 of the main body 300 at an end portion thereof, and a band part magnet 250 corresponding to the main body magnets 350-1, 350-2 and 350-3. As the length of the coupling part 210 increases, the number of the band part magnets 250 may increase.

The locking part 260 may be located on the upper side surface and/or the lower side surface of the coupling part 210. The locking part 260 may be a structure protruding from the upper side surface and/or the lower side surface of the coupling part 210. When the coupling part 210 is seated in the insertion groove 330, the locking part 260 may be fixed in the locking groove 340 of the main body 300. When the coupling part 260 is inserted into the locking groove 340, the band part 200 may be fixed to the main body 300. The band part 200 fixed to the main body 300 may be fixed at the corresponding location until a user's intended external force is applied.

The coupling part 210 may include a button part 230 for delivering an external force to the locking part 260. When an external force is applied to the button part 230, the locking part 260 may move to the inside of the coupling part 210 to separate the band part 200 from the main body 300.

The band part 200 may include an additional device 550 and a connector 500 contacting a port 400 of the main body 300. In this drawing, the port 400 may be formed in a form of an engaging clip, and the connector 500 may be formed in a form of a contact terminal of a zebra pattern.

The coupling part 210 may extend from one end of the band part 200, and may be formed into a shape corresponding to the insertion groove 330. The coupling part 210 may have a shape in which both sides of the band part 200 are elongated, and may include a locking part 260 corresponding to the insertion groove 330 of the main body 300 and a band part magnet 250 corresponding to the main body magnet 350 at both ends thereof.

The locking part 260 may be located on the upper side surface and/or the lower side surface of the coupling part 210. The locking part 260 may be a structure protruding from the upper side surface and/or the lower side surface of the coupling part 210. The locking parts 260 formed at both ends of the coupling part 210 may move into the coupling part 210 when the button is pressed, and may protrude from the coupling part 210 when an external force is removed. Thus, when the locking part 260 of the band part 200 is fixed in the locking groove 340, the band part 200 may be coupled to the main body 300.

The connector 500 may be located at a position corresponding to the port of the main body 300. When the port 400 of the engaging clip form and the connector 500 of the contact terminal form make contact with each other through the coupling of the main body 300 and the band part 200, the controller 180 inside the main body 300 and the additional device 550 of the band part 200 may exchange signals with each other. Accordingly, the controller 180 may identify the additional device 550, and may perform appropriate control.

Figure 36:
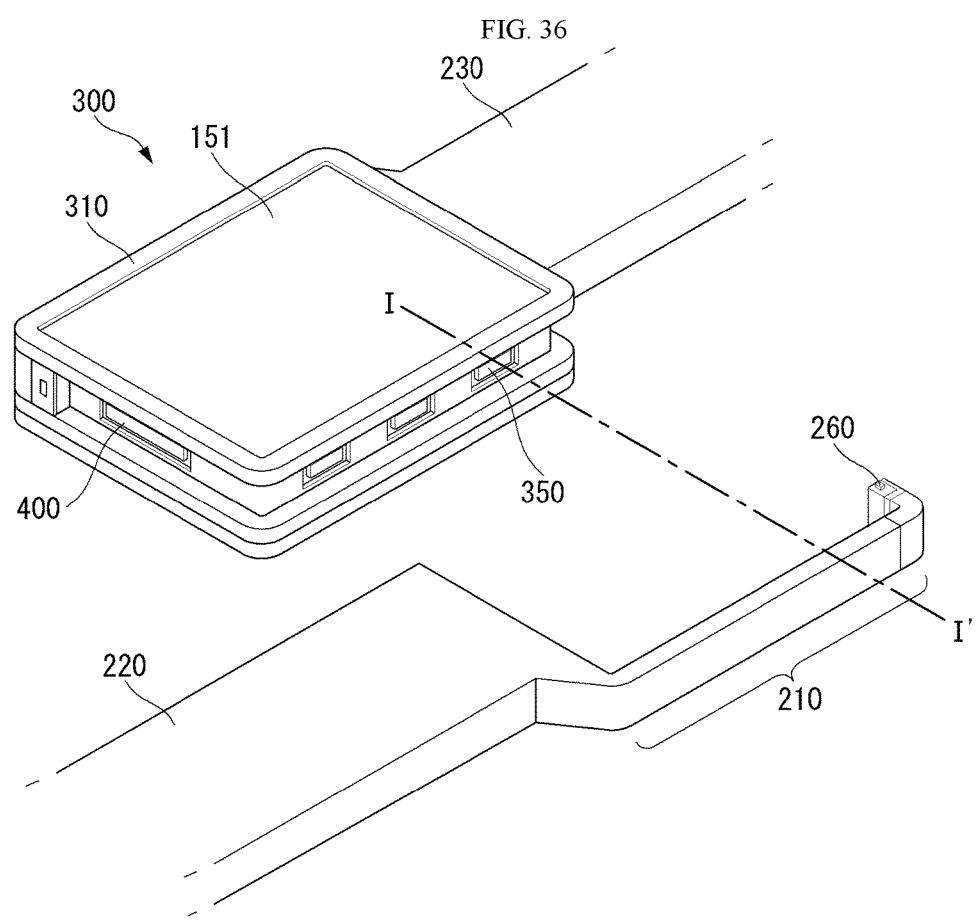
Figure 37:
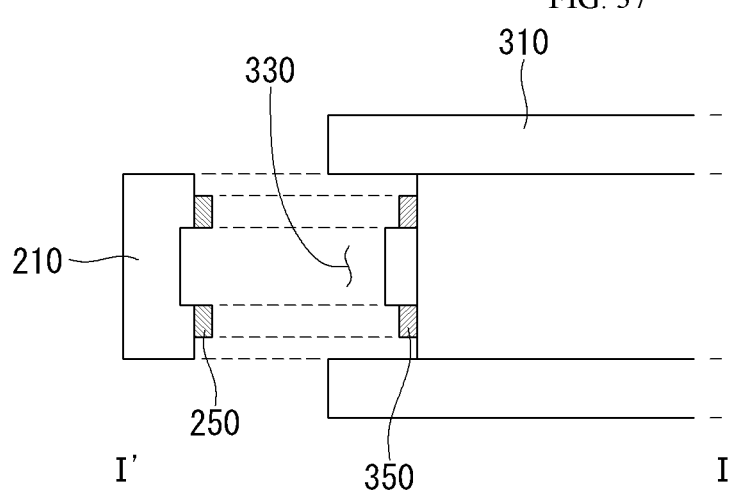

FIGS. 36 and 37 are views illustrating the coupling state of the main body 300 and the band 200 of the electronic device shown in FIG. 33, which illustrate the coupling state of the main body magnet 350 and the band part magnet 250.

In the magnetic coupling region of the main body 300 provided with the magnets 250 and 350 and the band part 200, an unevenness may be formed to secure the coupling using the magnet. For example, a convex unevenness may be formed in the main body 300, and a concave unevenness may be formed in the band part 200 to couple the main body 300 and the band part 200. The main body magnet 350 and the band part magnet 250 may be disposed on the outer circumferential surface of the unevenness. Thus, the fixing effect of the band part 200 can be enhanced by maintaining the coupling between the main body 300 and the band part 200 by the unevenness rather than simply being fixed only by the magnetic force.

Figure 38:
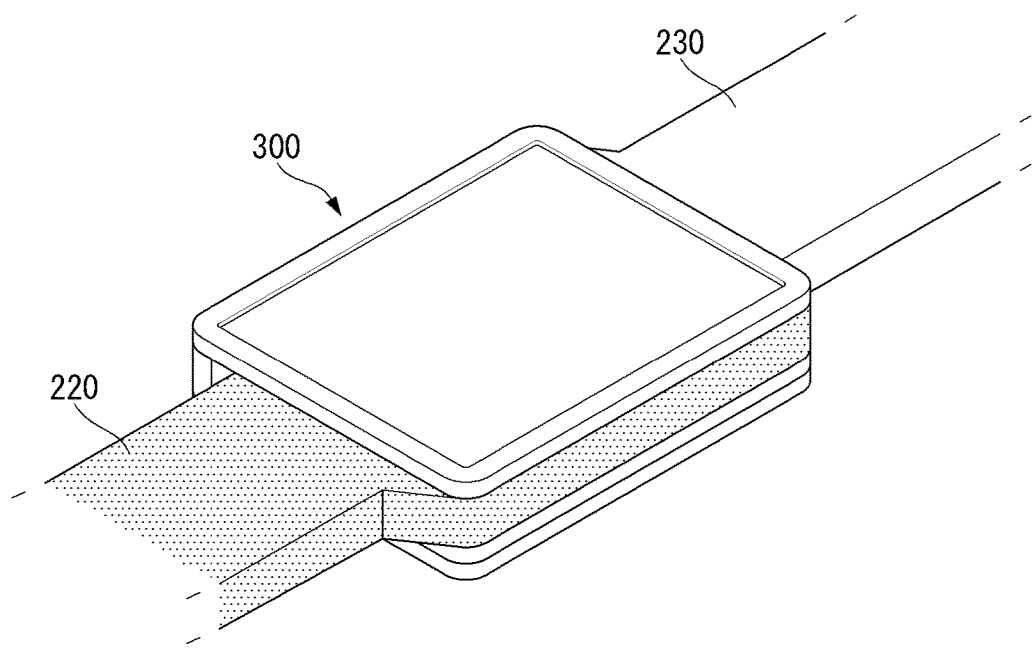
Figure 39:
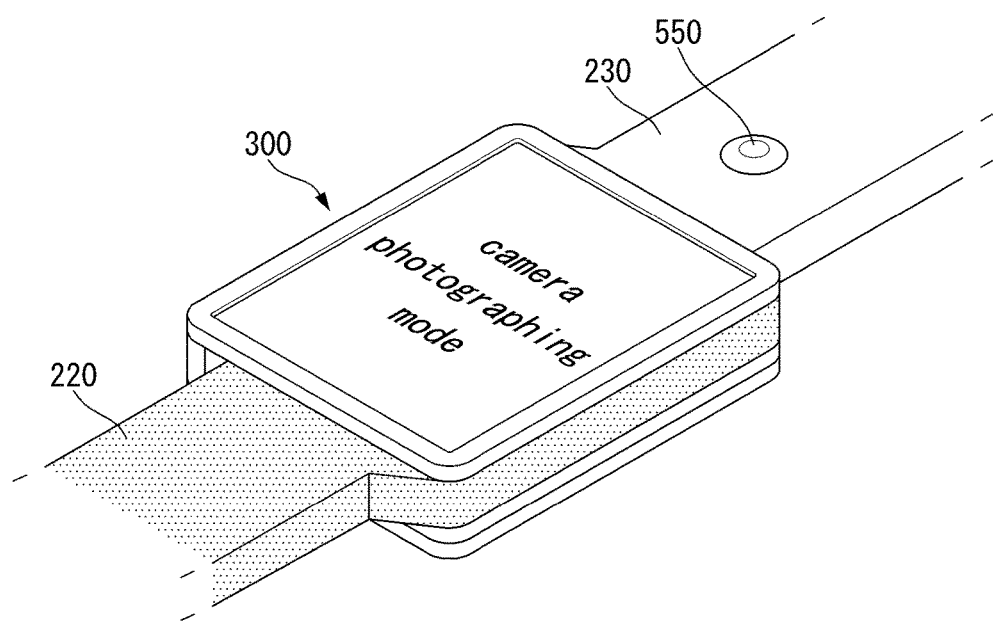
Figure 40:
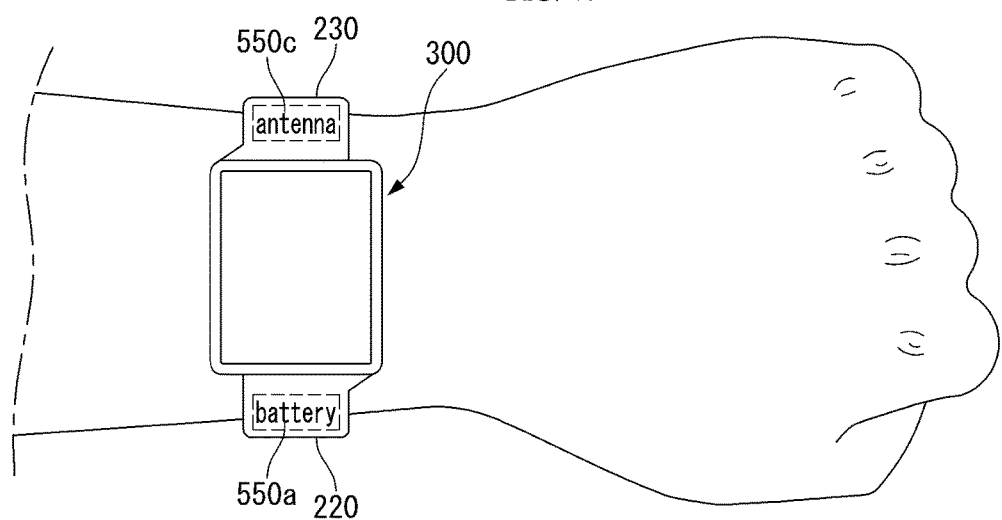

FIGS. 38 to 40 are views illustrating a use state of a watch-type electronic device according to another embodiment of the present invention.

FIG. 38 shows an embodiment in which a band part 200 of different colors is applied. Referring to FIG. 38, the band part 200 may include a first band part 220 and a second band part 230. The first and second band parts 220 and 230 may be coupled to one side of the main body 300 and the other side corresponding thereto, respectively. Accordingly, it may be possible to couple the first band part 220 and the second band part 230 of different colors to the main body 300.

The band part 200 may include a coupling part 210 extending along one side adjacent to a region contacting the main body 300 and having a shape surrounding a region where the band part 200 is coupled at the other side. That is, the first band part 220 and the second band part 230 may be formed to surround the whole of side surfaces of the main body 300 having a rectangular shape. Also, the first band part 220 and the second band part may be formed to surround only a portion of the side surface according to the length of the insertion groove 330 formed in the main body 300.

Thus, since the band part 200 can decorate the side surfaces of the main body 300 and can be detachably coupled to the main body 300 according to a user's selection, the color of the side surfaces of the main body 300 may be changed for the aesthetic effect through the band part 200.

FIG. 39 shows an embodiment in which the band part 200 includes a camera as the additional device 550.

The band part 200 may include a first band part 220 and a second band part 230. The first and second band parts 220 and 230 may be coupled to one side of the main body 300 and the other side corresponding thereto, respectively. The additional device 550 may be provided on either the first band part 220 or the second band part 230. In this embodiment, the second band part 230 may include a camera.

When the second band part 230 having the camera is connected to the main body 300, the electronic part 510 of the band part 230 may provide information for communication with the camera and an application for controlling the camera and the related functions. Here, when an application for camera control is already stored in the main body 300, the band part 230 may provide only information for identifying and controlling the camera.

The main body 300 may switch the operation mode to a camera photographing mode based on the camera-related information received from the band part 230. When the operation mode is switched according to the connection of the band part 200, the controller 180 of the main body 300 may display mode switching information on the display unit as "camera photographing mode".

Referring to FIG. 40, the band part 200 may include a first band part 220 and a second band part 230. The first and second band parts 220 and 230 may be coupled to one side of the main body 300 and the other side corresponding thereto, respectively. Thus, it may be possible to connect the two additional devices 550 by coupling the first band part 220 and the second band part 230, which include different additional devices 550, to the main body 300.

The first band part 220 and the second band part 230 may be coupled in opposite directions to both ends of the main body 300. Since a port 400 for connection of the additional device 550 can be formed in the coupling region of the band part 200, two or more ports 400 may be formed in the main body 300.

When the USB connector 502 is connected to the port 400 of the main body 300 through the coupling of the main body 300 and the band 200, the controller 180 inside the main body 300 and the addition device 550 of the band part 200 may exchange signals with each other. Accordingly, the controller 180 may identify the additional device 550, and may perform appropriate control.

Thus, the first band part 220 equipped with a battery 550a and the second band part 230 equipped with an antenna 550c may be connected to the main body 300 for use, respectively.

When the first band unit 220 equipped with the battery 550a and the second band unit 230 equipped with the antenna 550c are used in connection with each other, it may be desirable to minimize an interference for radio wave reception of the antenna 550c. In order to minimize the interference due to a contact of human body and facilitate the reception of radio waves from outside, it may be desirable to connect the second band unit 230 equipped with the antenna 550c in an outward direction of the user's wrist.

The present invention described above may be embodied as computer-readable codes into a medium in which programs are recorded. The computer readable medium may include all kinds of recording devices in which data that can be read by a computer system are stored. Examples of the computer readable medium include a hard disk drive (HDD), a solid state disk (SSD), a silicon disk drive (SDD), a ROM, a RAM, a CD-ROM, a magnetic tape, a floppy disk, and an optical data storage, and may also be implemented in the form of a carrier wave (e.g., transmission through the Internet). The computer may also include a controller 180 of the terminal. Accordingly, the above detail descriptions should not be construed as restrictive in all respects, and should be considered as illustrative. The scope of the present invention should be determined by rational interpretation of the appended claims, and all changes within the scope of equivalents of the present invention are included in the scope of the present invention.

The invention claimed is:

1. An electronic device comprising:
    a main body having a device with a controller mounted therein, the main body including a bezel disposed at an outer surface thereof, and a locking groove formed in the bezel; and
    a band including:
        an additional device that exchanges an electric signal with the device mounted in the main body;
        an electronic circuitry to provide information related to the additional device to the device mounted in the main body
        a coupling extension detachably coupled to the locking groove,
    wherein the coupling extension is formed to cover at least a portion of side surface regions of the bezel, and
    wherein the controller switches an operation mode of the device mounted in main body according to the information related to the additional device provided by the electronic circuitry when the main body and the band are coupled to each other.

2. The electronic device of claim 1, further comprising a display provided in the main body,
    wherein the controller further changes information provided on the display in accordance with the switched operation mode.

3. The electronic device of claim 1, wherein the additional device includes at least one of a camera, a sound output speaker, a microphone, a light output source, an antenna, a near-field communication (NFC) device, a battery, or a biosensor.

4. The electronic device of claim 1, wherein the information related to the additional device includes at least one of identification information related to the additional device, control information, or an application using the additional device.

5. The electronic device of claim 1, wherein the controller switches the operation mode of the device to a camera photographing mode according to camera-related information provided by the electronic circuitry to the controller when the additional device in the band includes a camera.

6. The electronic device of claim 1, wherein the controller switches the operation mode of the device to a sports mode according to biosensor-related information provided by the electronic circuitry to the controller when the additional device in the band includes a biosensor.

7. The electronic device of claim 1, wherein the coupling extension includes a pair of coupling extensions that are outwardly moved by an external force and engage the locking groove when the external force is removed, and the pair of coupling extensions include ends that are inwardly bent to engage the locking groove.

8. The electronic device of claim 1, wherein the coupling extension includes a locking protrusion protruding from at least one of an upper side surface or a lower side surface in contact with the bezel, the locking protrusion being moved toward an inside region of the coupling extension by an external force and then protruding at the locking groove to fix the band to the bezel.

9. The electronic device of claim 8, further comprising:
    a main body magnet provided in a side surface region of the bezel; and
    a band magnet provided on the coupling extension and magnetically coupled to the main body magnet.

10. The electronic device of claim 8, wherein the coupling extension includes a button that transfers the external force to the locking protrusion to move the locking protrusion to an inside surface of the coupling extension.

11. The electronic device of claim 8, wherein the coupling extension includes an elastic member that delivers an elastic force such that the locking protrusion outwardly moved by the external force moves to an original position when the external force ceases to be applied.

12. The electronic device of claim 1, wherein the bezel has a circular shape, and the main body further includes:
    lugs extending from sides of the circular bezel in opposite directions, and
    an insertion groove formed along a side surface of one or more of the lugs to receive the coupling extension, the locking groove being formed in at least one of an upper side or a lower side of the insertion groove.

13. The electronic device of claim 1, wherein the bezel has a rectangular shape and includes an insertion groove formed along a side surface of the bezel to receive the coupling extension, and the locking groove is formed in at least one of an upper side or a lower side of the insertion groove.

14. The electronic device of claim 1, further comprising a port formed in a coupling region of the bezel and the band, the port exchanging the electric signal between the device and the additional device.

15. The electronic device of claim 14, wherein the port includes a Universal Serial Bus (USB) port.

16. The electronic device of claim 1, wherein the additional device is a first additional device, a second additional device is mounted on the band, and the band includes a first band section equipped with the first additional device and a second band section equipped with the second additional device.

17. The electronic device of claim 1, wherein the electric signal is exchanged between the device and the additional device via a path that includes the coupling extension.

18. A method of controlling an electronic device comprising a main body having a device with a controller mounted therein, and a band having an additional device exchanging an electric signal with the device mounted in the main body and an electronic circuitry providing information related to the additional device to the controller, the method comprising:

receiving the information related to the additional device mounted on the band from the electronic circuitry when the main body and the band are coupled to each other;

switching an operation mode of device mounted in the main body to a predetermined operation mode based on the information related to the additional device mounted on the band, and displaying information related to the switched operation mode on the main body, wherein switching the operation mode of the device mounted on the main body to the predetermined operation includes:

switching the operation mode of the device mounted on the main body to a camera photographing mode according to camera-related information provided by the electronic circuitry to the controller when the additional device includes a camera; and switching the operation mode of the device mounted on the main body to a sports mode according to biosensor-related information provided by the electronic circuitry to the controller when the additional device includes a biosensor.

* * * * *